United States Patent
Iizuka et al.

(10) Patent No.: US 7,004,276 B2
(45) Date of Patent: Feb. 28, 2006

(54) REAR CUSHION INSTALLATION STRUCTURE OF LOW FLOOR TYPE VEHICLE

(75) Inventors: Chikashi Iizuka, Wako (JP); Yoshio Takada, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 5 days.

(21) Appl. No.: 10/666,099

(22) Filed: Sep. 18, 2003

(65) Prior Publication Data

US 2004/0124032 A1 Jul. 1, 2004

(30) Foreign Application Priority Data

Sep. 26, 2002 (JP) ............................. 2002-281990

(51) Int. Cl.
B62D 25/24 (2006.01)
(52) U.S. Cl. .................. 180/89.17; 180/219; 296/37.1
(58) Field of Classification Search ................ 180/219, 180/227, 89.17; 280/288.1, 783; 296/37.1
See application file for complete search history.

(56) References Cited

U.S. PATENT DOCUMENTS

| | | | | |
|---|---|---|---|---|
| 4,363,375 A | * | 12/1982 | Kamiya | 180/227 |
| 4,577,719 A | * | 3/1986 | Nomura et al. | 180/219 |
| 4,650,026 A | * | 3/1987 | Shiraishi | 180/227 |
| 4,744,434 A | * | 5/1988 | Miyakoshi et al. | 180/219 |
| 4,753,314 A | * | 6/1988 | Tsukiji | 180/227 |
| 4,901,813 A | * | 2/1990 | Kimura et al. | 180/230 |
| 5,044,646 A | * | 9/1991 | Iiga et al. | 180/219 |
| 5,501,292 A | * | 3/1996 | Kawashima et al. | 180/220 |
| 2004/0118362 A1 | * | 6/2004 | Inayama | 123/41.49 |
| 2004/0124029 A1 | * | 7/2004 | Takenaka et al. | 180/291 |

FOREIGN PATENT DOCUMENTS

| | | | |
|---|---|---|---|
| JP | 01237280 A | * | 9/1989 |
| JP | 2000-313388 | | 11/2000 |
| JP | 2001-88763 | | 4/2001 |
| JP | 2002-019677 | | 1/2002 |

* cited by examiner

*Primary Examiner*—Lesley D. Morris
*Assistant Examiner*—Daniel Yeagley
(74) *Attorney, Agent, or Firm*—Hanare, Schumann, Mueller & Larson, P.C.

(57) ABSTRACT

A low floor type vehicle 10 is disclosed with a housing box 59 having substantially similar longitudinal length to the longitudinal length of a seat is provided under the seat 58 and a rear cushion for the rear wheel is transversely arranged under the housing box. The housing box is provided with a lid for checking the rear cushion for the rear wheel at the bottom. The engine is suspended from a diamond type frame 20. The rear cushion for the rear wheel is arranged along the rear of an upper frame extended backward and downward from a head pipe.

6 Claims, 28 Drawing Sheets

REAR CUSHION INSTALLATION STRUCTURE OF LOW FLOOR TYPE VEHICLE

FIELD OF THE INVENTION

The present invention relates to a structure for improving the rear cushion installation structure of a low floor type vehicle.

BACKGROUND OF THE INVENTION

In a low floor type vehicle such as a scooter-type motorcycle or a scooter-type three-wheeled vehicle, a technique for mounting an engine below a body frame and arranging a rear cushion for a rear wheel substantially in the center of the body at the back of the engine is known (for example, Japanese published unexamined patent application No. 2001-88763 (see FIG. 2 on pp. 3 and 4)).

FIG. 28 is a schematic diagram showing the conventional type low floor type vehicle of FIG. 2 of Japanese published unexamined patent application No. 2001-88763.

A conventional type low floor type vehicle 300 is a scooter type motorcycle in which a power unit 320 is mounted in a double cradle type body frame under 310 and under a low floor 318.

The body frame 310 is composed of a pair of right and left upper frames 312, 312 (only the left one is shown and it is similar for the following components) extended backward and downward from a head pipe 311, a pair of right and left down frames 313, 313 extended downward from the head pipe 311, a pair of right and left center frames 314, 314 extended backward and upward on the way of the down frames 313, 313, a pair of right and left lower frames 315, 315 extended backward from each lower end of the down frames 313, 313 and a pair of right and left rear frames 316, 316 each of which connects each rear end of the lower frames 315, 315 and each rear end of the center frames 314, 314.

Each rear end of the upper frames 312, 312 is connected to each extension of the center frames 314, 314. The low floor 318 can be supported by the body frame 310. The low floor 318 is a floor for bearing the feet of a rider.

The power unit 320 is composed of a front longitudinal V-type engine 321 and a rear transmission unit 331. The V-type engine 321 is a water-cooled engine provided with a front cylinder 322 and a rear cylinder 323 so that a banking angle θ10 (an angle θ10 between the cylinders 322 and 323) of approximately 45° is formed when the engine is viewed from the side. The front cylinder 322 is extended substantially horizontally forward. The rear cylinder 323 is extended toward the head pipe 311. As a result, the banking angle θ10 is approximately 45° when the engine is viewed from the side. Naturally, a bisector L11 of the banking angle θ10 passes between the head pipe 311 and a front wheel 351. A reference number 324 denotes a crankshaft.

Each exhaust pipe 326, 326 connected to each cylinder 322, 323 is extended backward under the engine 321 and reaches a muffler 327.

Further, in the low floor type vehicle 300, an air cleaner 340 is arranged in space between the head pipe 311 and the rear cylinder 323, a radiator for cooling the engine 352 is arranged between the engine 321 and the front wheel 351, a seat 353 is arranged on the upside of the rear, and a front fuel tank 354 and a rear housing box 355 are arranged under the seat 353.

The transmission unit 331 is provided with a transmission device 333 which can be vertically swung with a final output shaft 332 as the base of a swing. A rear wheel 334 is attached to the transmission device 333 and the transmission device 333 can be suspended from the body frame 310 via a rear cushion 335. The rear cushion 335 is vertically arranged under the seat 353 and between the fuel tank 354 and the housing box 355. L12 denotes a straight line passing the head pipe 311 and the final output shaft 332.

The air cleaner 340 is provided with a filter element 341 inside and is provided with an intake port 342 on the upside. The intake port 342 is covered with an upper lid 343. Each cylinder 322, 323 is connected to such an air cleaner 340 via each intake coupling pipe 344, 345. The intake coupling pipe 344 connected to the front cylinder 322 reaches the air cleaner 340 through space between the cylinders 322 and 323. In the meantime, the intake coupling pipe 345 connected to the rear cylinder 323 reaches the air cleaner 340 through space above the rear cylinder 323.

However, as the rear cushion 335 is vertically arranged in the conventional type low floor type vehicle 300, the V-type engine 321 is mounted below the body frame 310 and the rear cushion 335 can be arranged substantially in the center of the body at the back of the engine, vertical space is small in the vicinity of an installed location at the upper end of the rear cushion 335. Therefore, there is a limit for effectively utilizing space under the seat 353. For example, as there is the rear cushion 335 vertically arranged, even if the fuel tank 354 under the seat 353 is arranged in another position, housing space cannot be expanded by extending the housing box 355 forward. To secure housing space for housing a long thing having a large diameter in the housing box 355, improvement is required.

Therefore, a need exists for structures for enabling the expansion of housing space in a housing box arranged under a seat in a low floor type vehicle in which a rear cushion for a rear wheel is arranged substantially in the center of the body.

SUMMARY OF THE INVENTION

In an embodiment, the rear cushion installation structure of a low floor type vehicle is based upon a low floor type vehicle in which an engine is mounted below a low floor and a rear cushion for a rear wheel is arranged substantially in the center of the body and is characterized in that the low floor type vehicle is provided with a housing box having substantially similar longitudinal length to the longitudinal length of a seat, under the seat, and the rear cushion for the rear wheel is transversely (horizontally) arranged under the housing box.

As the rear cushion for the rear wheel is transversely arranged under the housing box, the housing box extended longitudinally does not interfere with the rear cushion for the rear wheel located substantially in the center of the body. Therefore, the housing box having substantially similar longitudinal length to the longitudinal length of the seat can be arranged under the seat. Therefore, housing space for housing a long thing having a large diameter can be easily secured by extending the longitudinal length of the housing box and expanding the housing space.

In an embodiment, the lid for checking the rear cushion for the rear wheel is provided at the bottom of the housing box.

As the lid for checking of the rear cushion for the rear wheel is provided at the bottom of the housing box, the lid for checking can be detached and the rear cushion can be maintained and checked. As work for maintenance and a check is facilitated without detaching the housing box and a body cover, workability is enhanced.

In an embodiment, the engine is suspended by a diamond type frame composed of an upper frame extended backward and downward from a head pipe and a down frame extended downward from the head pipe and the rear cushion for the rear wheel is arranged along the rear of the upper frame.

As the body frame is a diamond type frame, the engine is suspended by the diamond type frame, the engine can function as a part of the body frame. Therefore, a frame member is not required to be arranged under the engine. Therefore, the engine can be lowered maximally, up to the height of the ground. The center of gravity of the low floor type vehicle is lowered by lowering the engine and driving stability can be enhanced.

Further, as the rear cushion for the rear wheel is arranged along the rear of the upper frame of the diamond type frame, the rigidity of the rear cushion for the rear wheel can be sufficiently secured by the rigid upper frame and suspension structure can be miniaturized.

DRAWINGS

DETAILED DESCRIPTION OF THE INVENTION

Referring to attached drawings, embodiments of the invention will be described below. "Front", "rear", "right", "left", "upper" and "lower" denote each position of a vehicle viewed from a rider, "Fr" means the front, "Rr" means the rear, "R" means the right, "L" means the left and "CL" means the center in the width of the body (the center of the body). The drawings shall be viewed with regard to the reference numbers.

Figure 1:
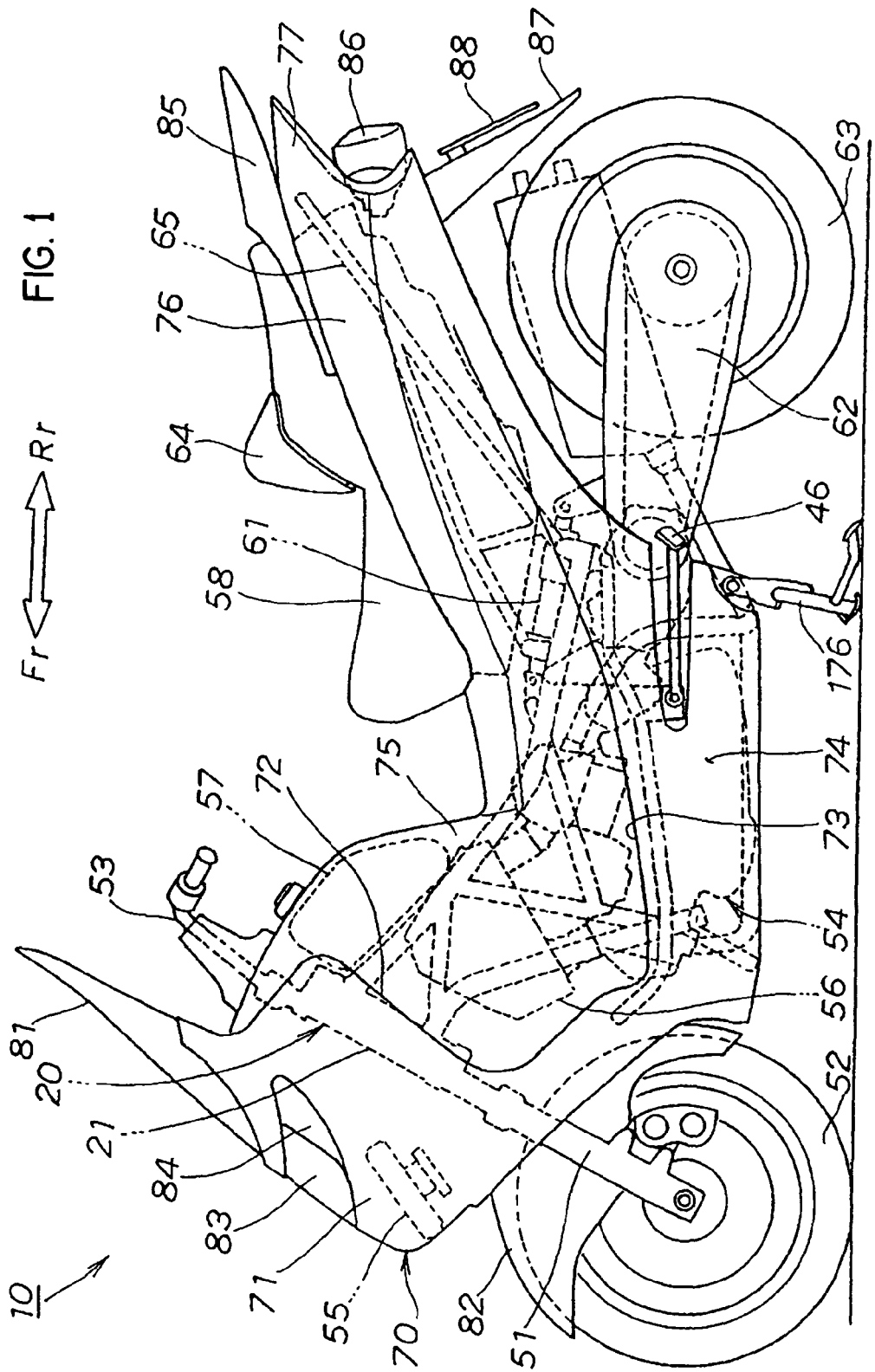
FIG. 1 is a left side view showing a low floor type vehicle according to an embodiment of the invention.
Figure 2:
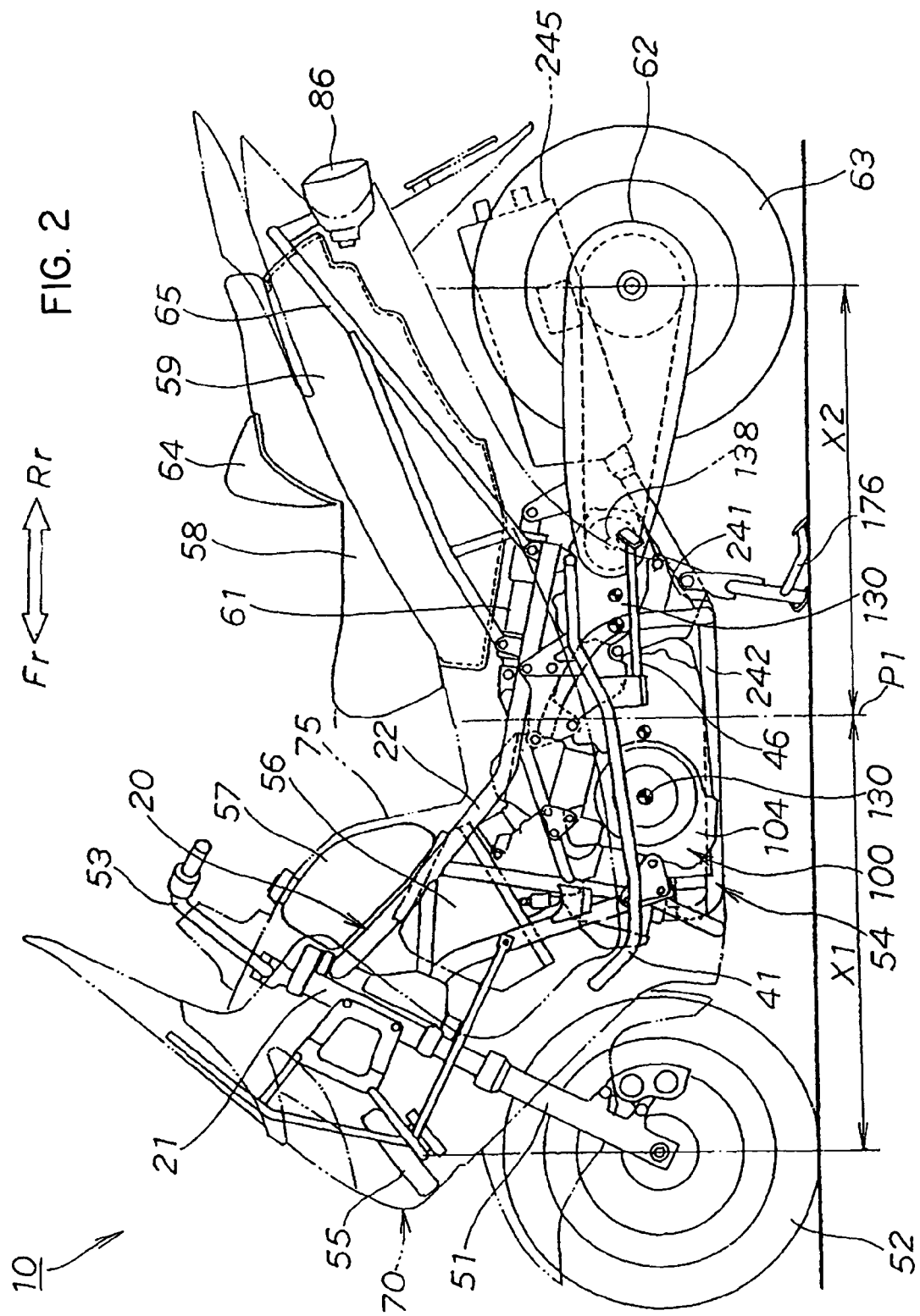
FIG. 2 is a second left side view showing the low floor type vehicle according to an embodiment of the invention.
Figure 3:
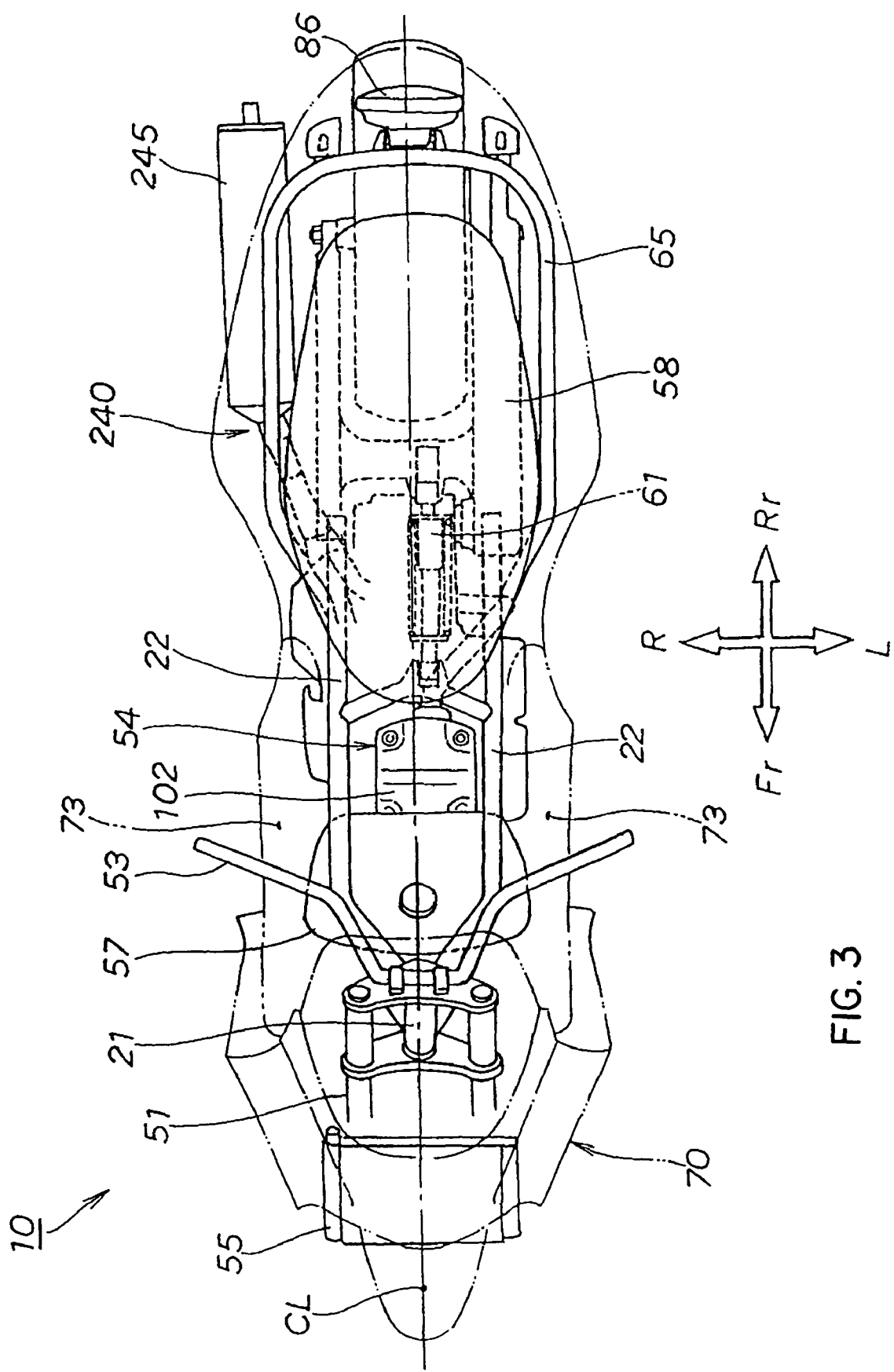
FIG. 3 is a top plan view showing the low floor type vehicle according to an embodiment of the invention.

First, the whole configuration of a low floor type vehicle 10 will be described. FIG. 1 is a left side view showing the low floor type vehicle according to an embodiment of the invention and shows the configuration in which a body cover is attached. FIG. 2 is a second left side view showing the low floor type vehicle according to an embodiment of the invention and shows the configuration in which the body cover is detached. FIG. 3 is a top plan view showing the low floor type vehicle according to an embodiment of the invention and shows the configuration in which the body cover is detached.

The low floor type vehicle 10 is mainly composed of a body frame 20, a front fork 51 attached to a head pipe 21 of the body frame 20, a front wheel 52 attached to the front fork 51, a handle 53 coupled to the front fork 51, a power unit 54 attached to a lower part of the body frame 20, a radiator 55 attached to a front upper part of the body frame 20, an air cleaner 56 and a fuel tank 57, a seat 58 attached to a rear upper part of the body frame 20, a housing box 59 attached to the rear of the body frame 20 under the seat 58, a swing arm 62 suspended by a rear cushion 61 (shock absorber) for a rear wheel in the rear of the body frame 20 and the rear wheel 63 attached to the swing arm 62, and is a vehicle of a full cowling type in which the whole body is covered with a body cover (cowl) 70.

The seat 58 is a tandem seat for a double ride and is provided with a movable (adjustable) seat back 64 for a rider in the center. Such a seat 58 can be attached to the body frame 20 via a seat rail 65 extended backward from the rear upper part of the body frame 20.

Referring to FIG. 2, P1 denotes an intermediate position of a wheel base (center distance between the front wheel 52 and the rear wheel 63), and distance X1 and distance X2 are equal.

Referring to FIG. 1, the body cover 70 is composed of a front cover 71 that covers the front of the head pipe 21 and the top of the front wheel 52, an inner cover 72 that covers the rear of the front cover 71, right and left low floors 73 (only the left is shown, hereinafter similar) as a step floor for putting a rider's foot, right and left floor skirts 74 extended downward from the outer edge of each low floor 73, a center cover 75 extended backward from the inner cover 72 and covering the center in the longitudinal direction of the body frame 20, a side cover 76 extended backward from the center cover 75 and covering the rear of the body frame 20, the seat rail 65 and the housing box 59 and a rear cover 77 covering the rear upper part of the body in the rear of the side cover 76 as shown in FIG. 1.

The center cover 75 is a member that also covers the air cleaner 56, the fuel tank 57 and the engine 100.

In these drawings, a reference number 81 denotes a wind screen, 82 denotes a front fender, 83 denotes a head lamp, 84 denotes a blinker, 85 denotes a rear spoiler that also functions as a rear grip, 86 denotes a tail lamp, 87 denotes a rear fender and 88 denotes a license plate.

Figure 4:
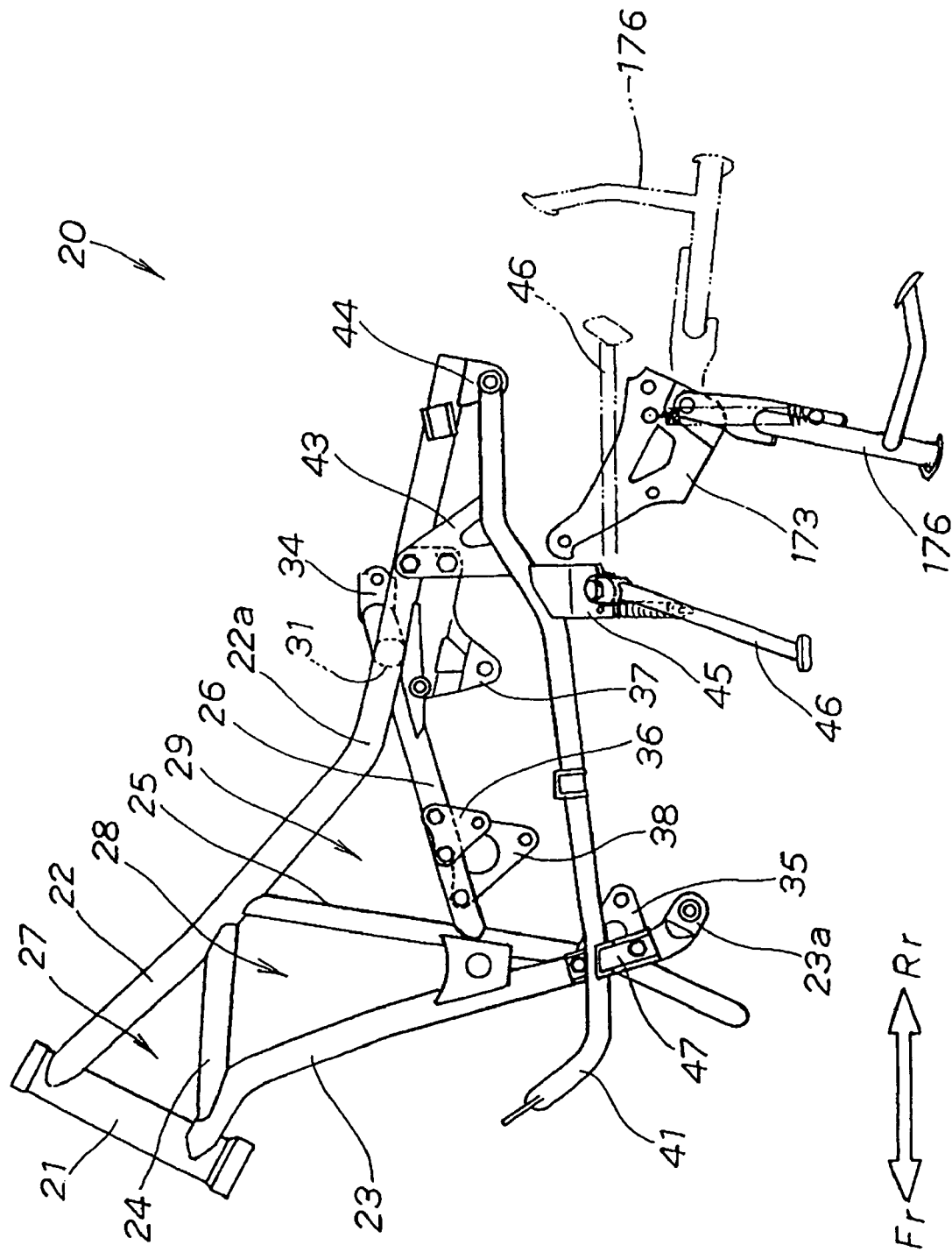
FIG. 4 is a left side view showing a body frame according to an embodiment of the invention.
Figure 5:
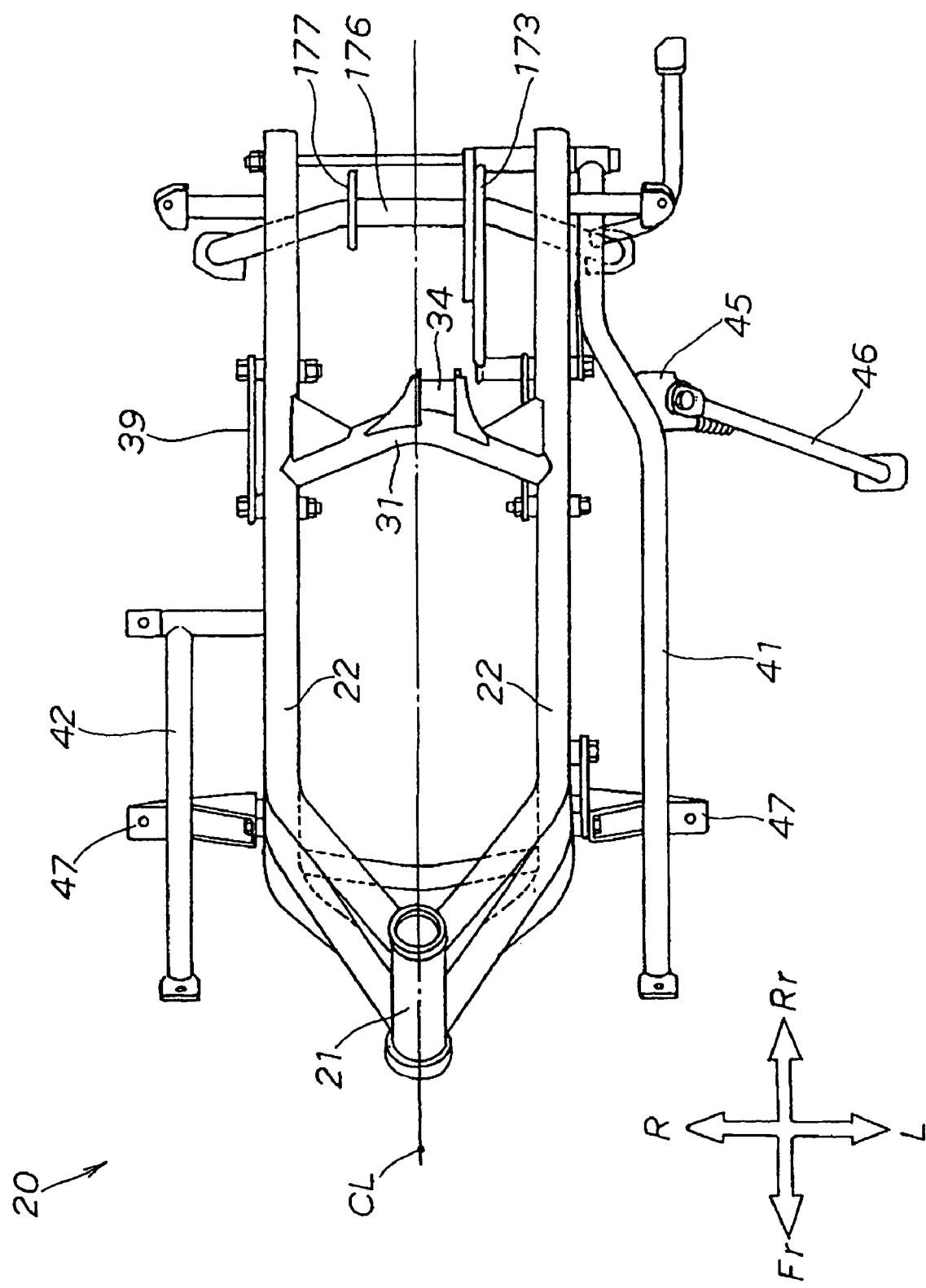
FIG. 5 is a top plan view showing the body frame according to an embodiment of the invention.
Figure 6:
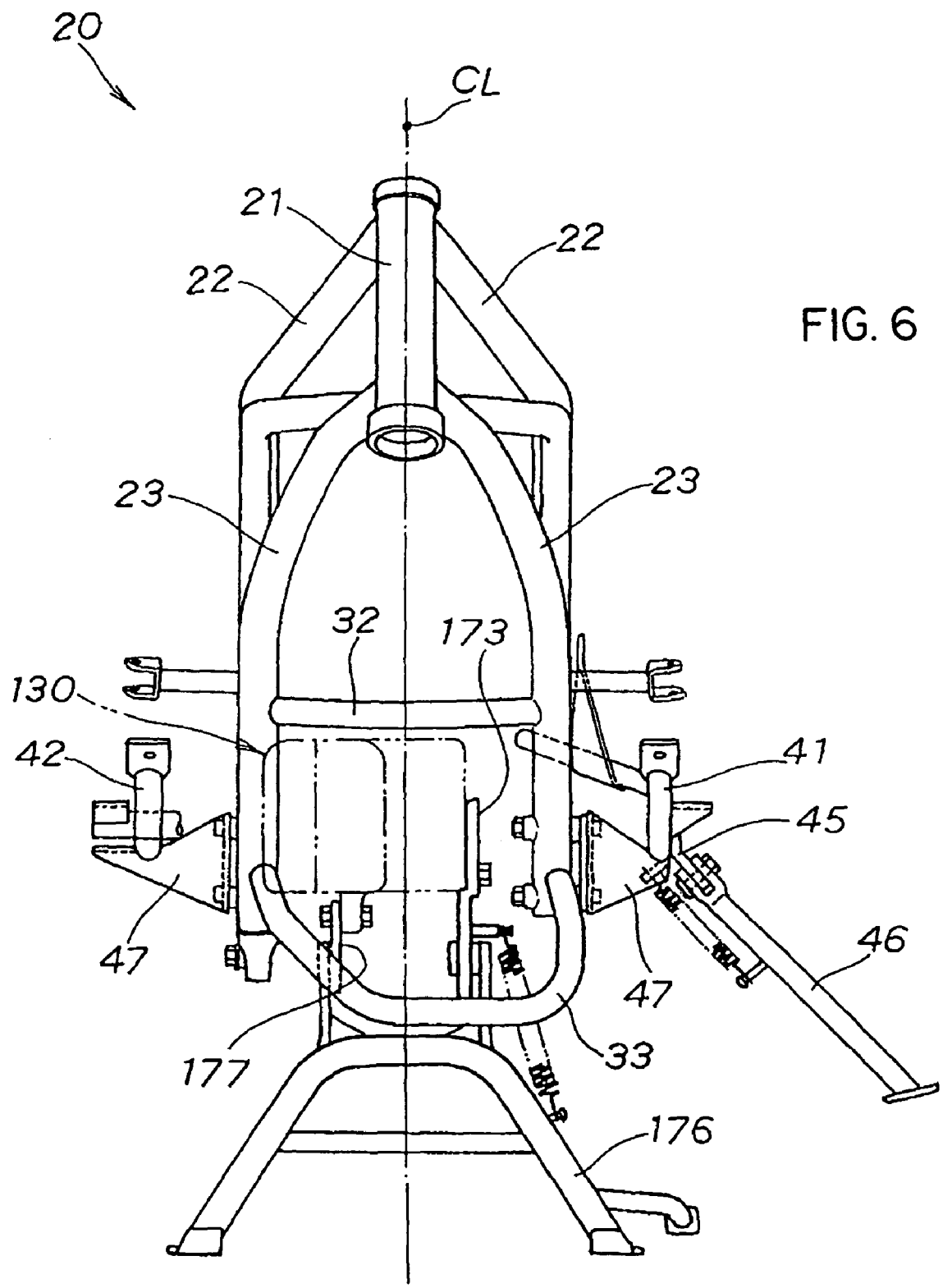
FIG. 6 is a front view showing the body frame according to an embodiment of the invention.
Figure 7:
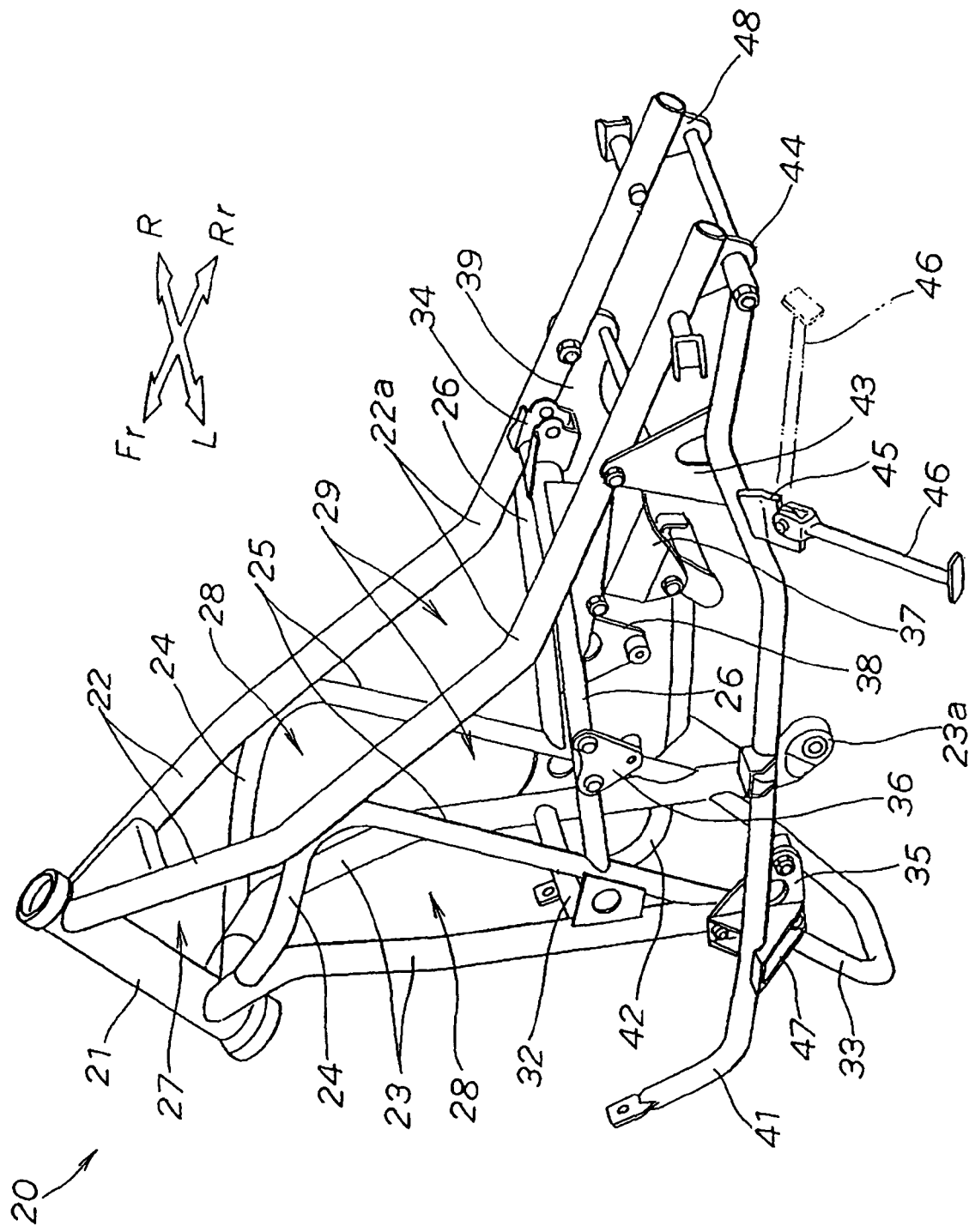
FIG. 7 is a perspective view showing the body frame according to an embodiment of the invention viewed from the left side.
Figure 8:
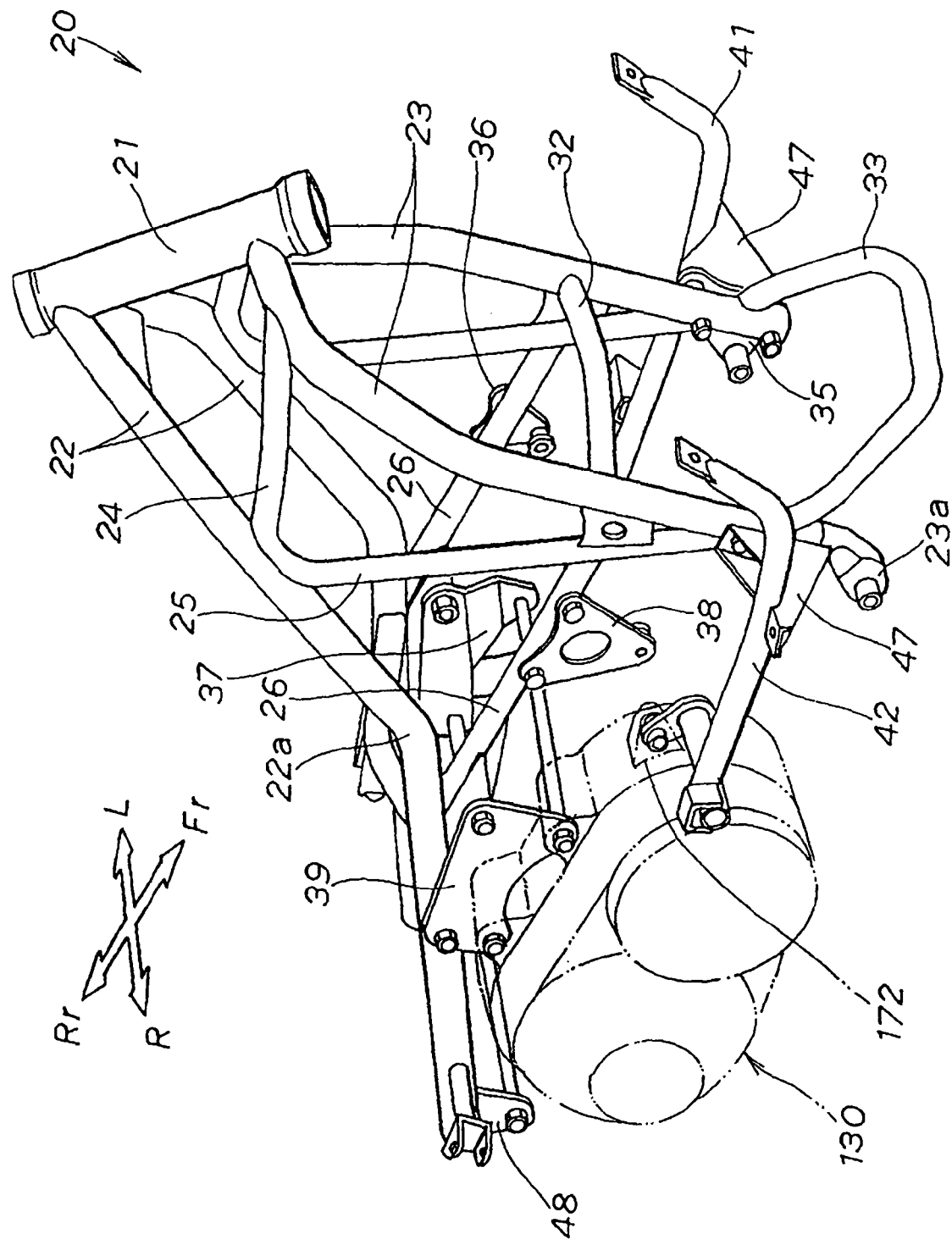
FIG. 8 is a perspective view showing the body frame according to an embodiment of the invention viewed from the right side.

Next, the body frame 20 will be described. FIG. 4 is a left side view showing the body frame according to an embodiment of the invention, FIG. 5 is a top plan view showing the body frame according to an embodiment of the invention, FIG. 6 is a front view showing the body frame according to an embodiment of the invention, FIG. 7 is a perspective view showing the body frame according to an embodiment of the invention viewed from the left side and FIG. 8 is a perspective view showing the body frame according to an embodiment of the invention viewed from the right side.

The body frame 20 is composed of a pair of right and left upper frames 22, 22 extended backward and downward from the head pipe 21 and a pair of right and left down frames 23, 23 extended downward from the head pipe 21 and coupled to the front of a crankcase 104 of the V-type engine 100 (see FIG. 2), and is a diamond type frame. A diamond type frame is a frame with the engine suspended as a stressed member rather than cradled underneath by tubes of the frame.

The upper frames 22, 22 are pipes which are extended substantially straight, being inclined backward and downward from the upside of the head pipe 21, the degree of inclination of which is reduced from the end inclined downward 22a and which are extended further backward and downward. The down frames 23, 23 are pipes extended backward and downward from the downside of the head pipe 21 and having more inclination than the upper frames 22, 22.

The left upper frame 22 and the left down frame 23, and the right upper frame 22 and the right down frame 23 respectively form a trussing type frame structure (triangular frame structure).

For the trussing type frame structure, three triangular spaces are formed when viewed from the side (27 to 29) by extending a substantially horizontal first reinforcement 24 toward the upper frame 22 from a part in which the head pipe 21 and the down frame 23 are joined, extending a second reinforcement 25 toward the lower end of the down frame 23 from a part in which the upper frame 22 and the first reinforcement 24 are joined and further extending a third reinforcement 26 between the vicinity of the end 22a inclined downward of the upper frame 22 and a point on the second reinforcement 25.

The first space 27 is formed by the head pipe 21, the upper frame 22 and the first reinforcement 24. The second space 28 is formed by the down frame 23, the first and second reinforcements 24, 25. The third space 29 is formed by the upper frame 22, the second and third reinforcements 25, 26.

Further, the rigidity of the body frame 20 is secured by extending a cross member 31 between the right and left upper frames 22, 22 in the vicinity of the end 22a inclined downward of the upper frame 22 and extending two cross members 32, 33 between the respective halfway points of the right and left down frames 23, 23 and between the lower ends of the down frames. The cross member 31 between the right and left upper frames 22, 22 is provided with a bracket for a cushion 34.

The body frame 20 is provided with a first hanger plate 35 on the left side at the lower end of the left down frame 23, is provided with a second hanger plate on the left side 36 on the left third reinforcement 26, is provided with a third hanger plate on the left side 37 in the vicinity of a part in which the left upper frame 22 and the left third reinforcement 26 are joined, and is provided with a left fourth hanger plate 44 at the rear end of the left upper frame 22. The body frame 20 is also provided with a right hanger 23a at the lower end of the right down frame 23 as shown in FIG. 8, is provided with a right first hanger plate 38 on the right third reinforcement 26, is provided with a right second hanger plate 39 in the vicinity of a part in which the right upper frame 22 and the right third reinforcement 26 are joined and is provided with a right third hanger plate 48 at the rear end of the right upper frame 22.

These hanger plates 35 to 39, 44, 48 are coupling members which can be detached from the body frame 20.

The low floors 73 (see FIG. 1) are supported by right and left low floor supporting frames 41, 42 fixed to the respective lower parts of the down frames 23, 23 via stays 47, 47 and extended longitudinally.

Referring to FIG. 7, the left low floor supporting frame 41 is a pipe the rear of which is coupled to the rear of the left upper frame 22 via a stay 43 and the left fourth hanger plate 44 and a side stand 46 is integrally held by the rear. The left fourth hanger plate 44 also functions as a stay for the low floor supporting frame.

The side stand 46 is attached to the left low floor supporting frame 41 via the bracket 45 so that the side stand can stand and can be housed. As shown in FIG. 8, the rear of the right low floor supporting frame 42 is coupled to a bracket 172 of a transmission unit 130 shown by an imaginary line.

The mounting structure of the low floor supporting frames 41, 42 described above will be described below.

The low floor supporting frames 41, 42 extended longitudinally are fixed to the respective lower parts of the down frames 23, 23 in the diamond type frame and the low floors 73 (see FIG. 1) are supported by these low floor supporting frames 41, 42. Therefore, though the vehicle is configured so that the V-type engine 100 (see FIG. 2) is lowered, the low floor 73 can be securely and stably, that is, effectively supported.

Further, the rear of the left low floor supporting frame 41 is fixed to the lower part of the left down frame 23 is also coupled to the rear of the left upper frame 22. Therefore, the left low floor supporting frame 41 extended longitudinally can be more sufficiently fixed to the body frame 20. As a result, the rigidity of the low floor supporting frame 41 can be enhanced, the low floor 73 can be more securely and more stably supported and the supporting rigidity can be enhanced.

In the meantime, as shown in FIG. 8, the rear of the right low floor supporting frame 42 fixed to the lower part of the right down frame 23 is further coupled to the rigid transmission unit 130. Therefore, the right low floor supporting frame 42 extended longitudinally can be more sufficiently fixed to the body frame 20 and the transmission unit 130. As a result, the rigidity of the low floor supporting frame 42 can be enhanced, the low floor 73 can be more securely and more stably supported and the supporting rigidity can be enhanced.

Furthermore, as shown in FIG. 4, as the side stand 46 is integrated with the rear of the left low floor supporting frame 41, the low floor supporting frame 41 can fulfill a role for holding the side stand 46. Therefore, the function of another functional component can be also achieved, the bracket 45 for holding the side stand 46 can be miniaturized and a holding component formed by another component is not required to be provided. In addition, as the side stand 46 is held by the low floor supporting frame 41 extended longitudinally, the side stand 46 can be set to an arbitrary position in a longitudinal direction and the degree of freedom in design is enhanced.

Figure 9:
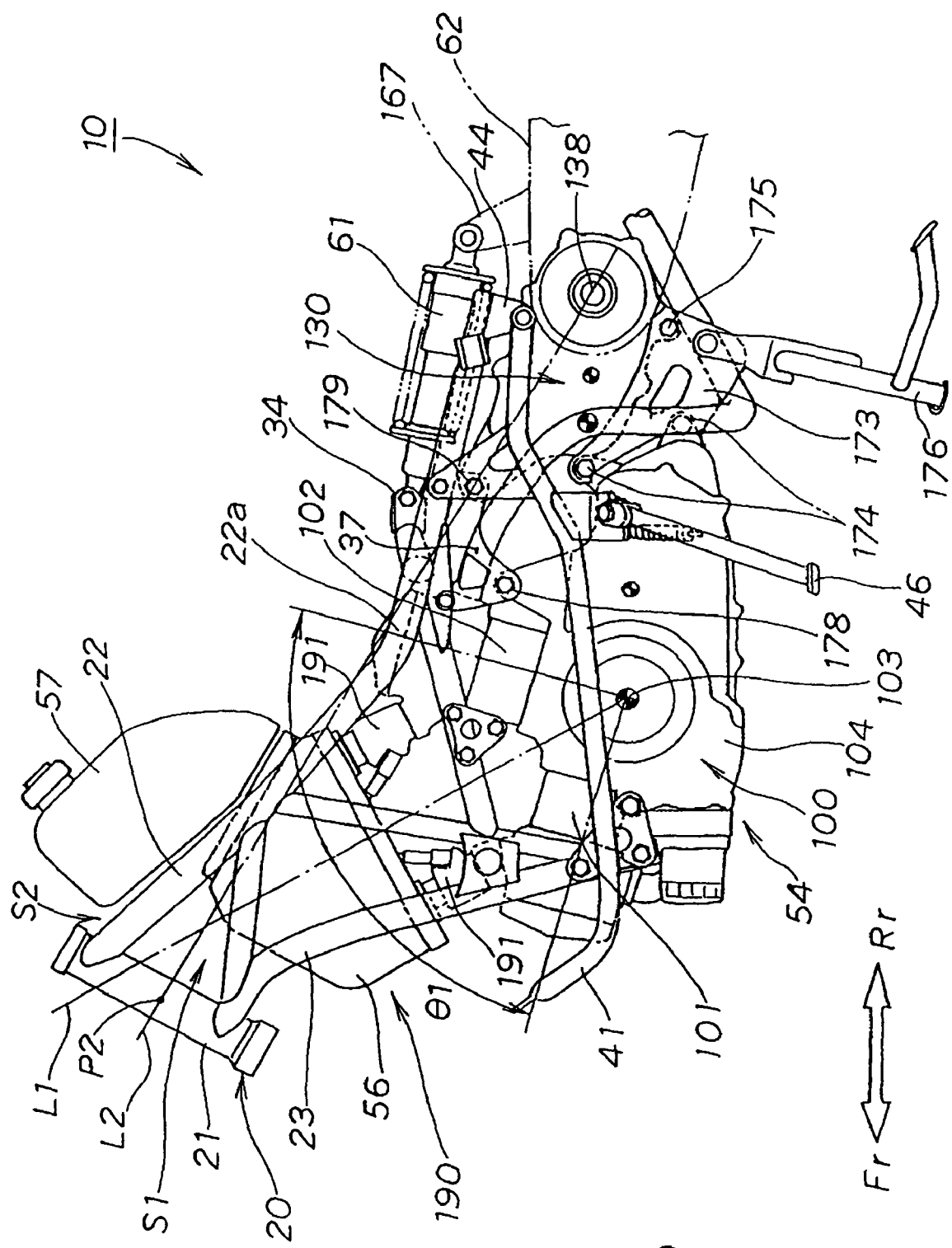
FIG. 9 is a left side view showing the body frame, a power unit and the circumference of an air cleaner and a fuel tank respectively according to an embodiment of the invention.
Figure 10:
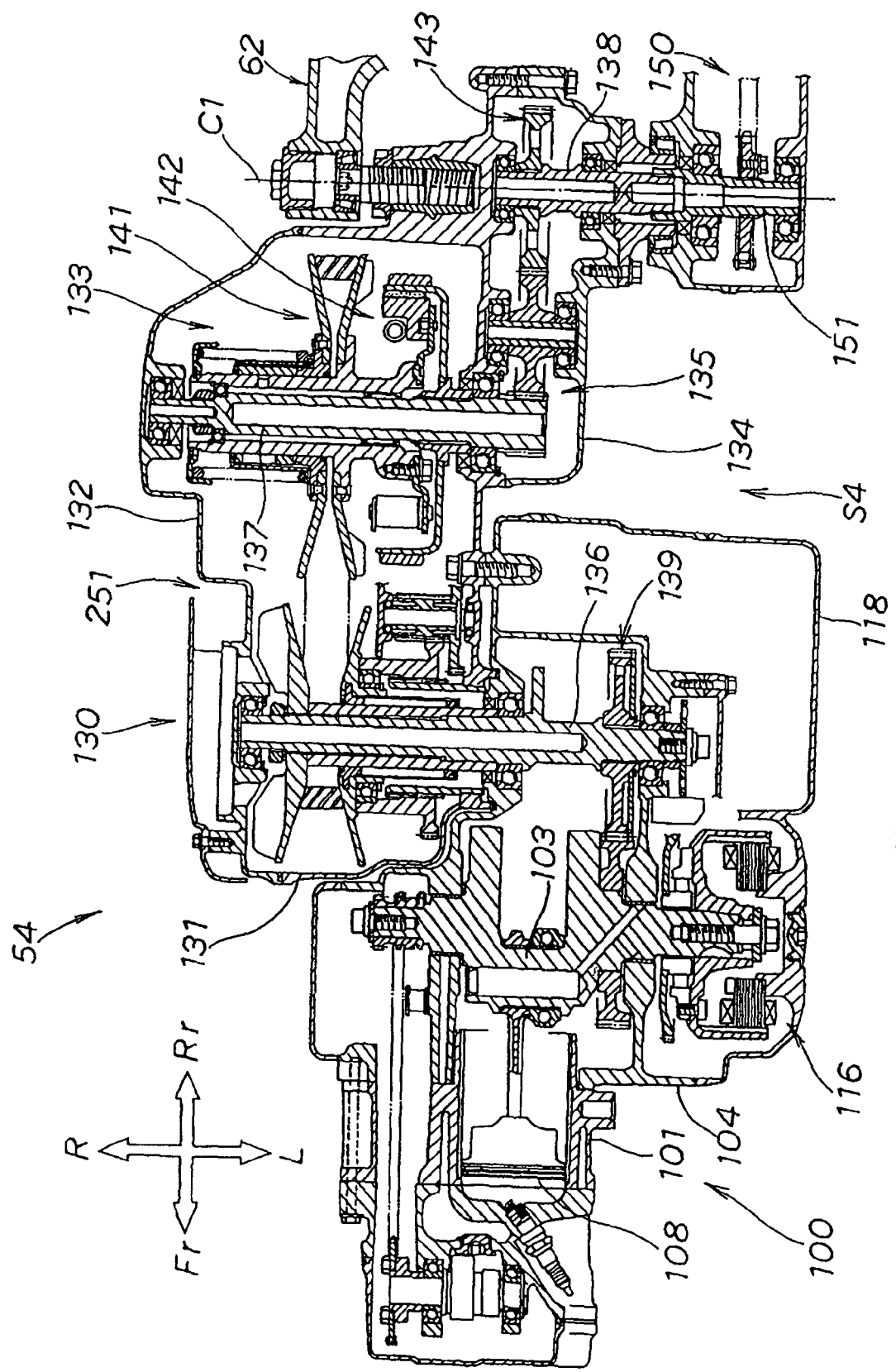
FIG. 10 is a cross sectional view showing the power unit according to an embodiment of the invention.
Figure 11:
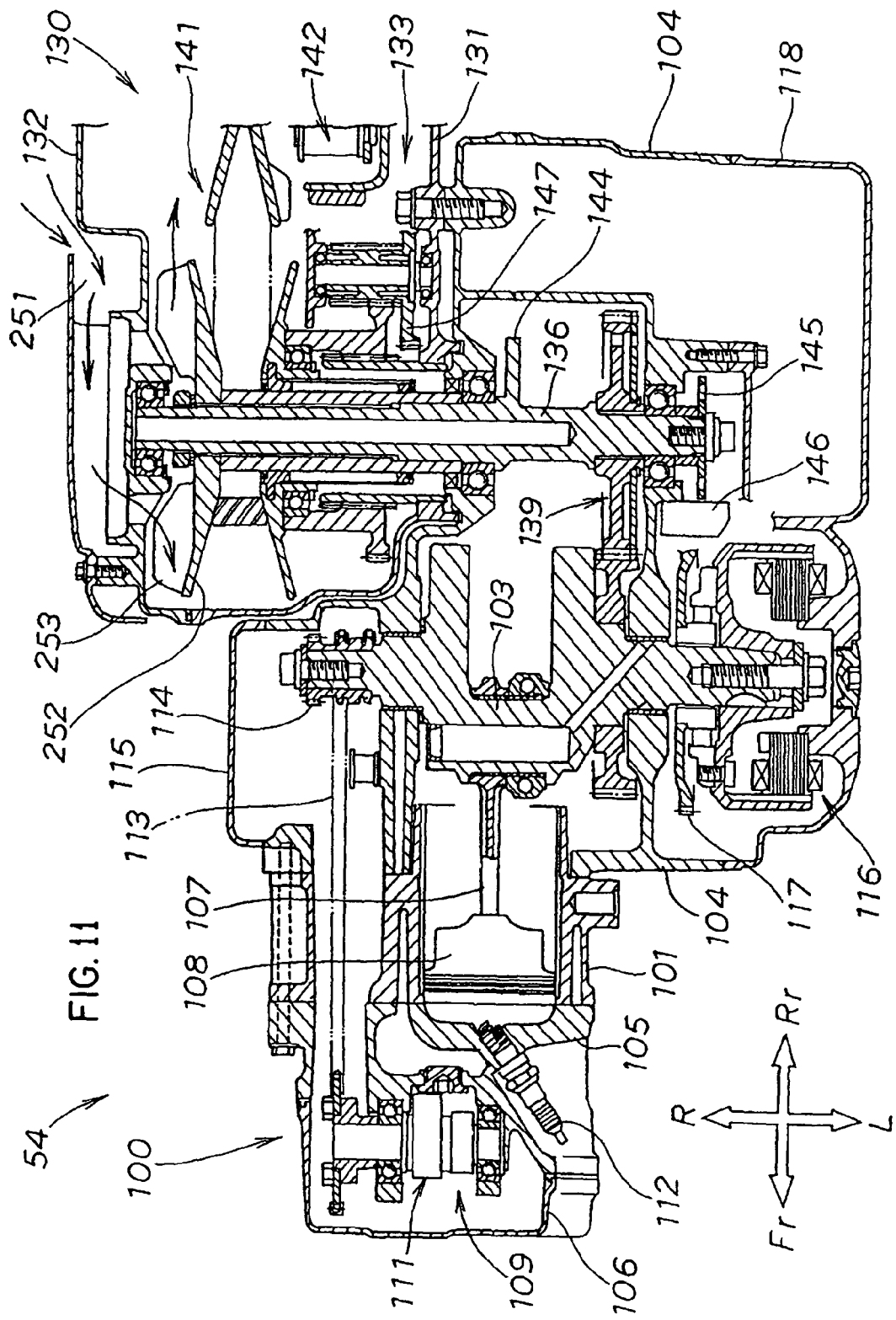
FIG. 11 is a cross sectional view showing a front half of the power unit according to an embodiment of the invention.
Figure 12:
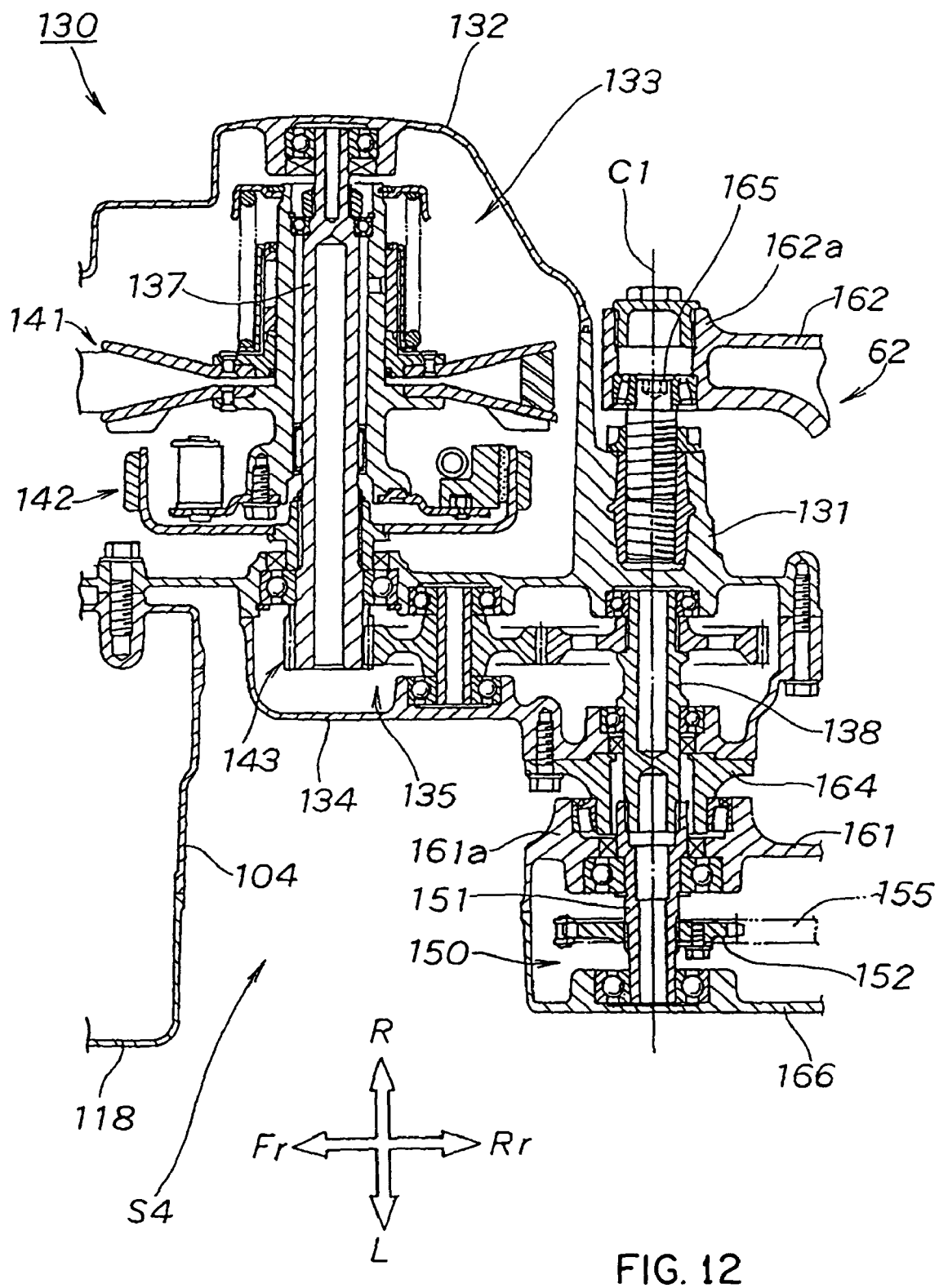
FIG. 12 is a cross sectional view showing a rear half of the power unit according to an embodiment of the invention.
Figure 13:
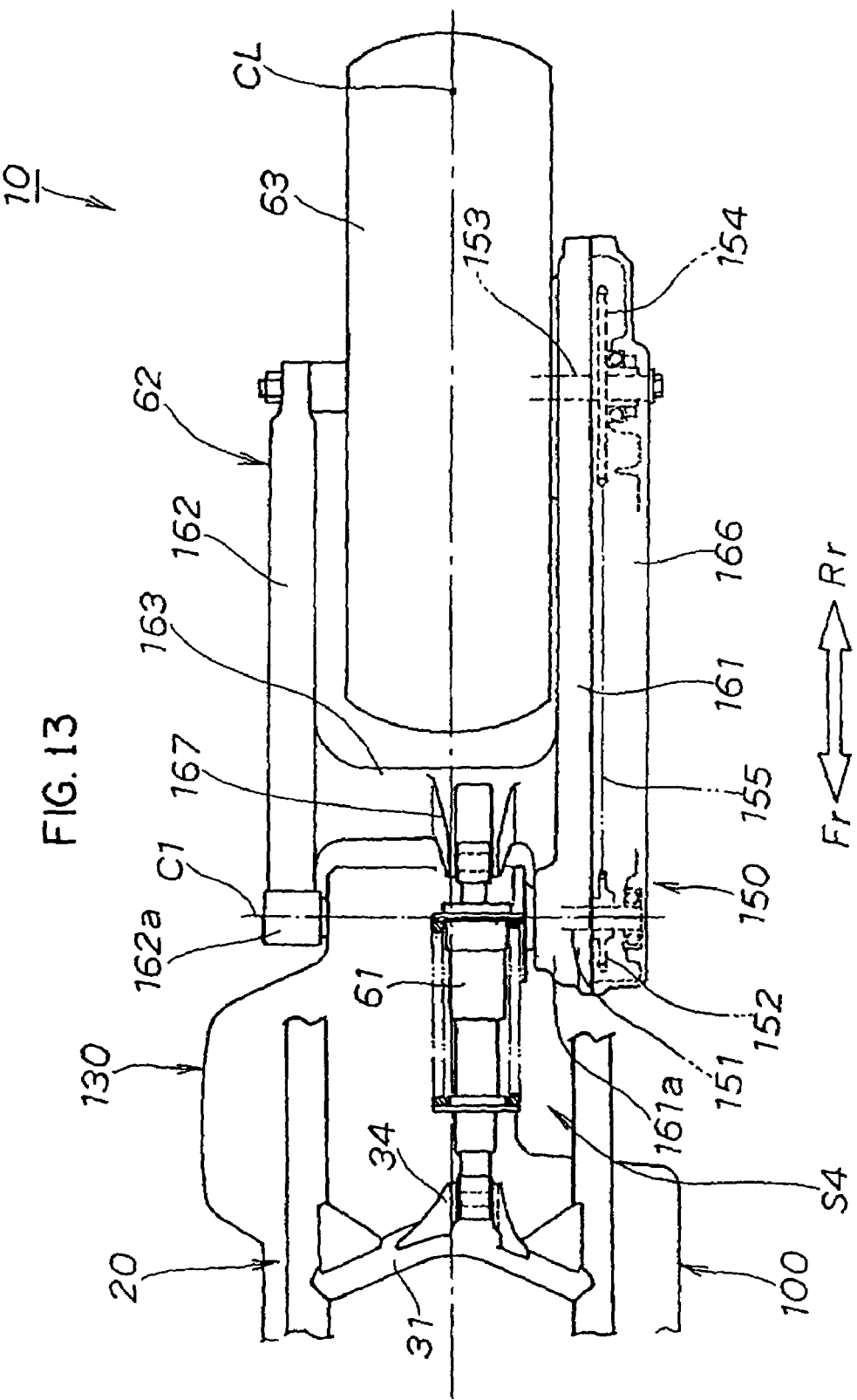
FIG. 13 is a plan showing the rear of the power unit and the circumference of a swing arm for a rear wheel respectively according to an embodiment of the invention.

Next, the configuration of the circumference of the power unit 54 will be described. FIG. 9 is a left side view showing the circumference of the body frame, the power unit, the air cleaner and the fuel tank respectively according to an embodiment of the invention. FIG. 10 is a cross sectional view showing the power unit according to an embodiment of the invention and the power unit 54 viewed from the top is shown as expanded sectional structure. FIG. 11 is a cross sectional view showing a front half of the power unit according to an embodiment of the invention and corresponds to FIG. 10. FIG. 12 is a cross sectional view showing a rear half of the power unit according to an embodiment of the invention and corresponds to FIG. 10. FIG. 13 is a plan showing the circumference of the rear of the power unit according to an embodiment of the invention and the swing arm for the rear wheel.

The power unit 54 is composed of the front longitudinal V-type engine 100 and the rear transmission unit 130. That is, the power unit 54 is provided with the transmission unit 130.

As shown in FIG. 9, the V-type engine 100 is a two-cylinder engine set so that when it is viewed from the side, a banking angle θ1 (an angle θ1 between the cylinders 101 and 102) is approximately 90° or more than 90°. In the V-type engine 100, the front cylinder 101 in a bank, that is, the front cylinder 101 is substantially horizontally extended forward so that the cylinder is directed above the axle of the front wheel 52 (see FIG. 2). The rear cylinder 102 in the bank, that is, the rear cylinder 102 is substantially vertically extended upward so that the cylinder is directed toward the end inclined downward 22a of the upper frame 22. The V-type engine 100 is arranged with the bisector L1 of the banking angle θ1 directed toward the head pipe 21 as described above.

Further, FIG. 9 shows that the front cylinder 101 in the bank is arranged in front of the right and left down frames 23, 23 by arranging the crankshaft 103 of the V-type engine 100 in front of the intermediate position P1 (see FIG. 2) of the wheel base and the rear cylinder 102 in the bank is arranged between the right and left upper frames 22, 22 (see FIG. 3, too).

The V-type engine 100 can be arranged as in front as possible by arranging the front cylinder 101 in the bank in front of the right and left down frames 23, 23. As a result, as the center of gravity of the low floor type vehicle 10 can be set in front, a load onto the front wheel 52 and the rear wheel 63 (see FIG. 2) can be more suitably distributed.

Further, the position of the crankshaft 103 of the V-type engine 100 is shifted in front by arranging the front cylinder 101 in the bank in front. In this case, the bisector L1 of the banking angle θ1 is also directed toward the head pipe 21. As the bisector L1 of the banking angle θ1 is closer to a right angle by quantity in which the position of the crankshaft 103 is shifted in front, the rear cylinder 102 in the bank is accordingly inclined backward in the body. Therefore, the height of the rear cylinder 102 in the bank can be reduced. Therefore, the degree of freedom in mounting the V-type engine 100 is enhanced.

Furthermore, as the rear cylinder 102 in the bank is arranged between the right and left upper frames 22, 22, it has no effect upon the rear cylinder 102 in the bank to lower the upper frames 22, 22. Therefore, the upper frames 22, 22 can be arranged in as a low position as possible. Therefore, as the center of gravity of the body frame 20 is lowered, the center of gravity of the low floor type vehicle 10 can be lowered and the vibration can be reduced. In addition, as the low floor 73 (see FIG. 1) can be lowered, the driving of the low floor type vehicle 10 is facilitated. Further, when a rider rides on the vehicle, he/she can more easily straddle the body frame 20 by lowering the upper frames 22, 22.

To enable the arrangement in front of the V-type engine 100, the radiator 55 for the engine (the water-cooled engine) 100 is arranged in front of the head pipe 21 as shown in FIG. 2. The V-type engine 100 can be arranged as in front as possible by shifting the radiator 55 heretofore arranged in front of the water-cooled engine in front of the head pipe 21.

The respective lower halves of the V-type engine 100 and the transmission unit 130 are arranged below the low floor supporting frames 41, 42 (only the left frame is shown in FIG. 9). Therefore, the V-type engine 100 and the transmission unit 130 can be mounted in the low floor type vehicle 10 with them also arranged below the low floors 73 (see FIG. 1) supported by the low floor supporting frames 41, 42 from the downside. The crankshaft 103 is located below the low floors 73 and the low floor supporting frames 41, 42.

Hereby, the V-type engine 100 and an intake system 190 are arranged in space S1 under a straight line L2 passing a central point P2 in the height of the head pipe 21 and a final output shaft 138 of the transmission unit 130. In addition, the bisector L1 of the banking angle θ1 can be directed toward the head pipe 21.

The intake system 190 is a system for supplying air for combustion to the V-type engine 100 and includes the air cleaner 56 and each intake coupling pipe 191, 191 for connecting the air cleaner 56 and each cylinder 101, 102.

As the V-type engine 100 is arranged with the bisector L1 of the banking angle θ1 directed toward the head pipe 21, the banking angle θ1 can be set to a large angle equal to or exceeding approximately 90°. The vibration of the V-type engine 100 can be controlled by setting the banking angle θ1 to such a large angle and large space for arranging the intake system 190 including the intake coupling pipes 191, 191 for each cylinder 101, 102 and the air cleaner 56 can be secured. Therefore, the degree of freedom in designing the intake system 190 is enhanced.

Further, as the bisector L1 of the bank angle θ1 is directed toward the head pipe 21, a large space can be secured between each cylinder in the bank of the V-type engine and the head pipe 21. As the intake system 190 including the intake coupling pipes 191, 191 and the air cleaner 56 is arranged in such large space with the intake system directed toward the head pipe 21, the intake system 190 and the V-type engine 100 can be efficiently coupled and the performance of the V-type engine 100 can be enhanced. Besides, the intake system 190 can be miniaturized in a relatively low position. Therefore, the fuel tank 57 can be easily arranged above the low intake system 190 and the mass can be concentrated in the front.

As the center of gravity of the low floor type vehicle 10 can be set in the front by arranging the fuel tank 57 in the front of the low floor type vehicle 10, a load onto the front wheel 52 and the rear wheel 63 can be more suitably distributed. In addition, as the fuel tank 57 is not required to be arranged under the seat 58 (see FIG. 2), a large space is secured under the seat 58 and a housing box 59 (see FIG. 2) having a large housing space can be provided.

Furthermore, as the V-type engine 100 and the intake system 190 are arranged in the space S1 under the straight line L2 passing the head pipe 21 and the final output shaft 138 of the transmission unit 130, space S2 above the air cleaner 56 can be effectively utilized. Therefore, the fuel tank 57 as a functional component can be easily arranged above the air cleaner 56.

Though the end of the rear cylinder 102 in the bank and the upper end of the air cleaner 56 of the intake system 190 are protruded slightly upward from the straight line L2, they are located in a range in which they are substantially equivalent to the upside contour of the upper frames 22, 22 and can be substantially regarded as arranged in the space S1 under the straight line L2 passing the head pipe 21 and the final output shaft 138.

FIGS. 10 to 12 show the sectional configuration of the power unit 54. For the V-type engine 100, the rear cylinder 102 in the bank is not shown.

The V-type engine 100 is composed of a crankcase 104 of a type divided into right and left two, the front cylinder 101 in the bank and the rear cylinder 102 in the bank (see FIG. 9) respectively coupled to the crankcase 104, a head 105 and a head cover 106 respectively coupled to the respective ends of these cylinders 101, 102, a crankshaft 103 extended in the direction of the width of the body and housed in the crankcase 104 so that the crankshaft can be rotated, a piston 108 coupled to the crankshaft 103 via a connecting rod 107, a valve train 111 housed in a cam chamber 109 and an ignition plug 112, and is a water-cooled engine provided with a water-cooled jacket.

In the drawings, a reference number 113 denotes a cam chain, 114 denotes a driving gear for a cooling water pump, 115 denotes a right side cover, 116 denotes an alternator and 117 denotes a gear for driving the crankshaft driven by a starter motor (described later).

The left end of the crankshaft 103, the alternator 116 and the circumference of the left end of a first transmission shaft 136 described later are covered by covering the left side of the crankcase 104 with a left side cover 118.

The transmission unit 130 is configured so that it is connected to the engine 100 on one side (the right side R) of the V-type engine 100, is extended backward on one side (the right side R) of the low floor type vehicle 10 and it drives the rear wheel 63 from the other side (the left side L) of the low floor type vehicle 10 via a pivot of the swing arm 62 for the rear wheel.

Hereby, the power unit 54 is configured by combining the crankcase 104 and the transmission unit 130 in a U shape when they are viewed from the top and a substantially U-shaped opening when it is viewed from the top can be provided on the other side (the left side L) of the low floor type vehicle 10.

As a result, the change of only the V-type engine 100 or only the transmission unit 130 is enabled, and the power unit 54 has high flexibility.

The transmission unit 130 is composed of a main case 131 attached to the right face of the rear of the crankcase 104 and extended backward, a first cover 132 that closes an opening on the right side of the main case 131, a first transmission chamber 133 formed by the main case 131 and the first cover 132, a subcase 134 overlapped with the left side of the rear of the main case 131, a second transmission chamber 135 formed by the main case 131 and the subcase 134, the first transmission shaft 136 extended in the direction of the width of the body from the rear of the crankcase 104 to the first transmission chamber 133, a second transmission shaft 137 extended in the direction of the width of the body from the rear of the first transmission chamber 133 to the second transmission chamber 135, the final output shaft 138 extended from the second transmission chamber 135 to the left outside via the subcase 134, a first gear train 139 that transmits motive power from the left end of the crankshaft 103 to the left end of the first transmission shaft 136, a belt type continuously variable transmission 141 that transmits motive power from the right end of the first transmission shaft 136 to the right end of the second transmission shaft 137, a centrifugal clutch 142 and a second gear train 143 that transmits motive power from the left end of the second transmission shaft 137 to the final output shaft 138.

For the belt type continuously variable transmission 141, a motor control method that the shift is controlled by a servo motor not shown via a gear for shift 147 is adopted.

A reference number 144 denotes a balancer, 145 denotes a reluctor, 146 denotes a pulser (an angle sensor of the crankshaft) and the pulser is used for controlling the ignition and the fuel injection of the engine 100.

Further, to explain referring to FIG. 13, the motive power of the V-type engine 100 can be transmitted from the transmission unit 130 to the rear wheel 63 via a chain drive mechanism 150 by connecting a transmission shaft 151 to the left end of the final output shaft 138 via splines, attaching a driving sprocket 152 to the transmission shaft, in the meantime, attaching a driven sprocket 154 to an axle 153 of the rear wheel 63 and putting a chain 155 between these driving and driven sprockets 152, 154.

The axis C1 of the final output shaft 138 is also the center C1 (the center C1 of a swing) of the pivot of the swing arm for the rear wheel 62.

The swing arm 62 is a member substantially in a H type when it is viewed from the top and composed of a left arm 161, a right arm 162 and a cross member 163 connecting the left and right arms 161, 162, and can support the rear wheel 63 at the rear end so that the rear wheel can be rotated.

Such a swing arm 62 is arranged so that the right side of the rear of the main case 131 and the left side of the rear of the subcase 134 are put between the respective front ends of the left and right arms 151, 162. The swing arm 62 can be attached so that it can be vertically swung by supporting a left supported part 161a provided to the front end of the left arm 161 by the left side of the rear of the subcase 134 via a left pivot 164 and supporting a right supported part 162a provided to the front end of the right arm 162 by the right side of the rear of the main case 131 via a right pivot 165.

The pivot 165 is a male screw for screwing so that it can be screwed into the main case 131. The right supported part 162a can be attached to the main case 131 by exposing the end of the pivot 165 and fitting it to the right supported part 162a after the pivot 165 is screwed into the main case 131 beforehand and the swing arm 62 is positioned in the center C1 of the pivot.

The left arm 161 also functions as a chain case, and the driving and driven sprockets 152, 154 and the chain 155 can be housed by covering the opening on the left side of the left arm 161 with a chain cover 166.

As is clear from the description, in the power unit 54, the opening substantially in the U shape when it is viewed from the top surrounded by the rear end of the crankcase 104, the left sides of the main case 131 and the subcase 134 of the transmission unit 130 and the front end of the left arm 161 of the swing arm 62 can be provided to the other side (the left side L) of the low floor type vehicle 10.

Figure 14:
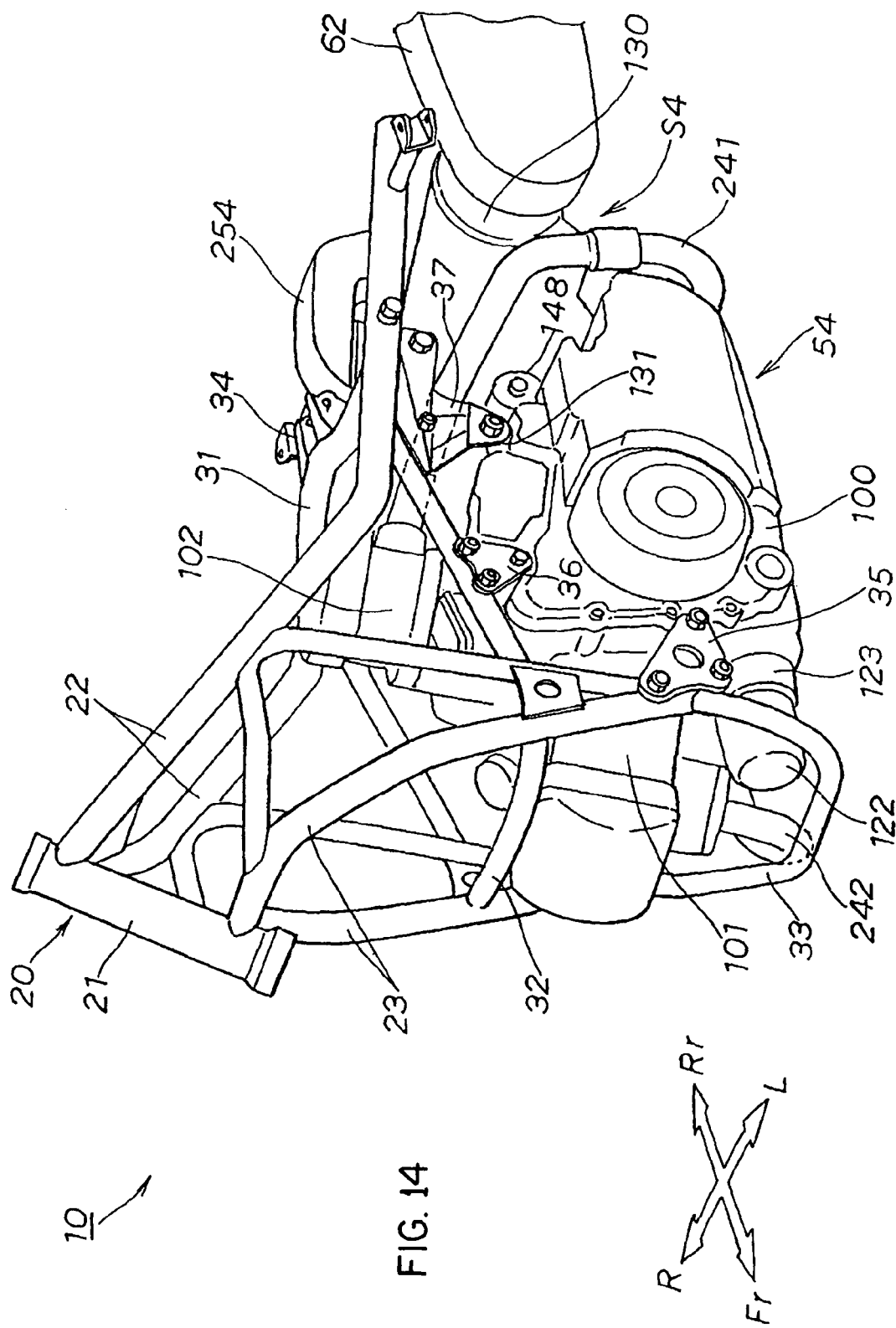
FIG. 14 is a perspective view showing the body frame and the circumference of the power unit respectively viewed from the left front according to an embodiment of the invention.
Figure 15:
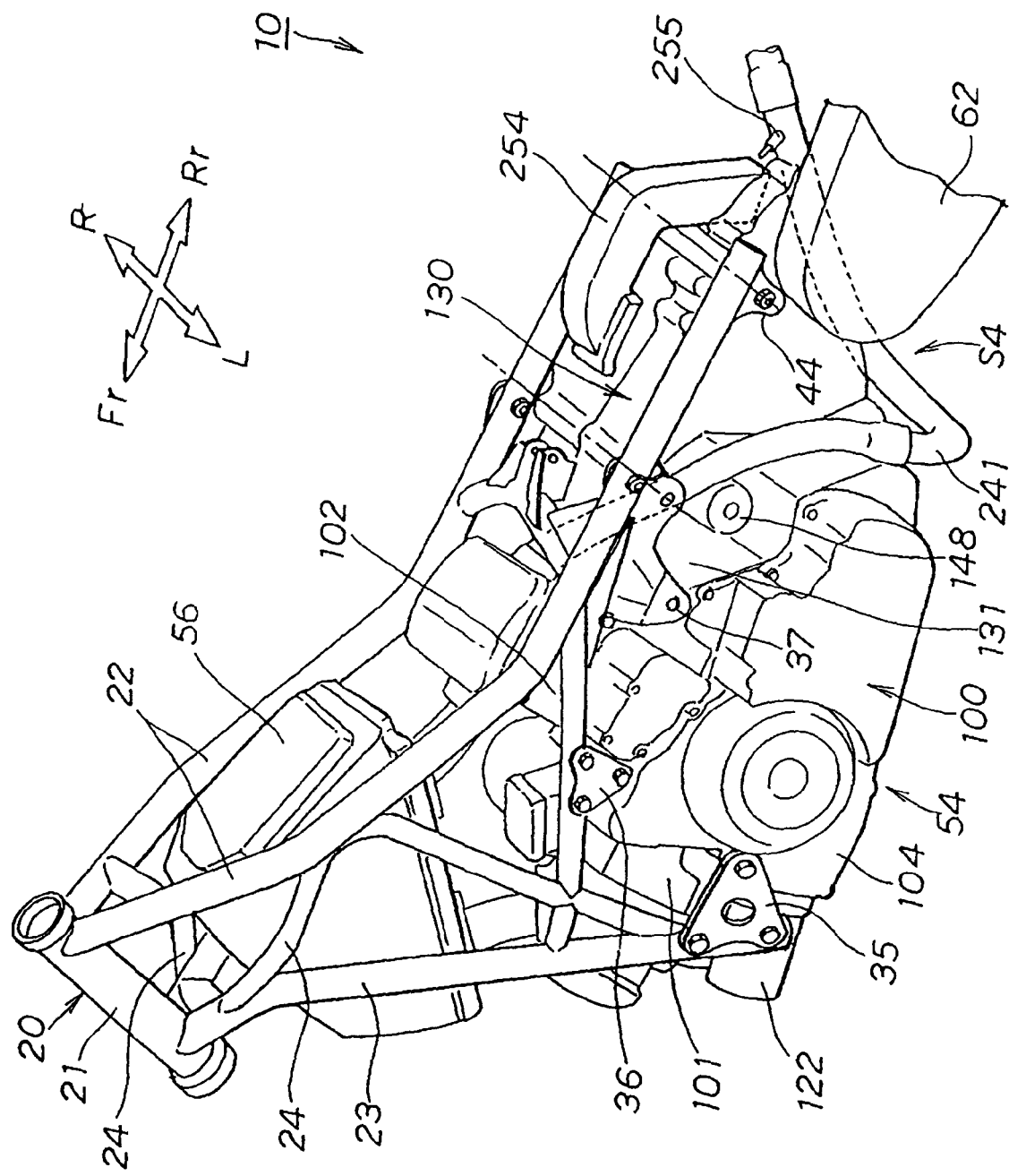
FIG. 15 is a perspective view showing the body frame, the power unit and the circumference of the air cleaner respectively viewed from the left rear according to an embodiment of the invention.
Figure 16:
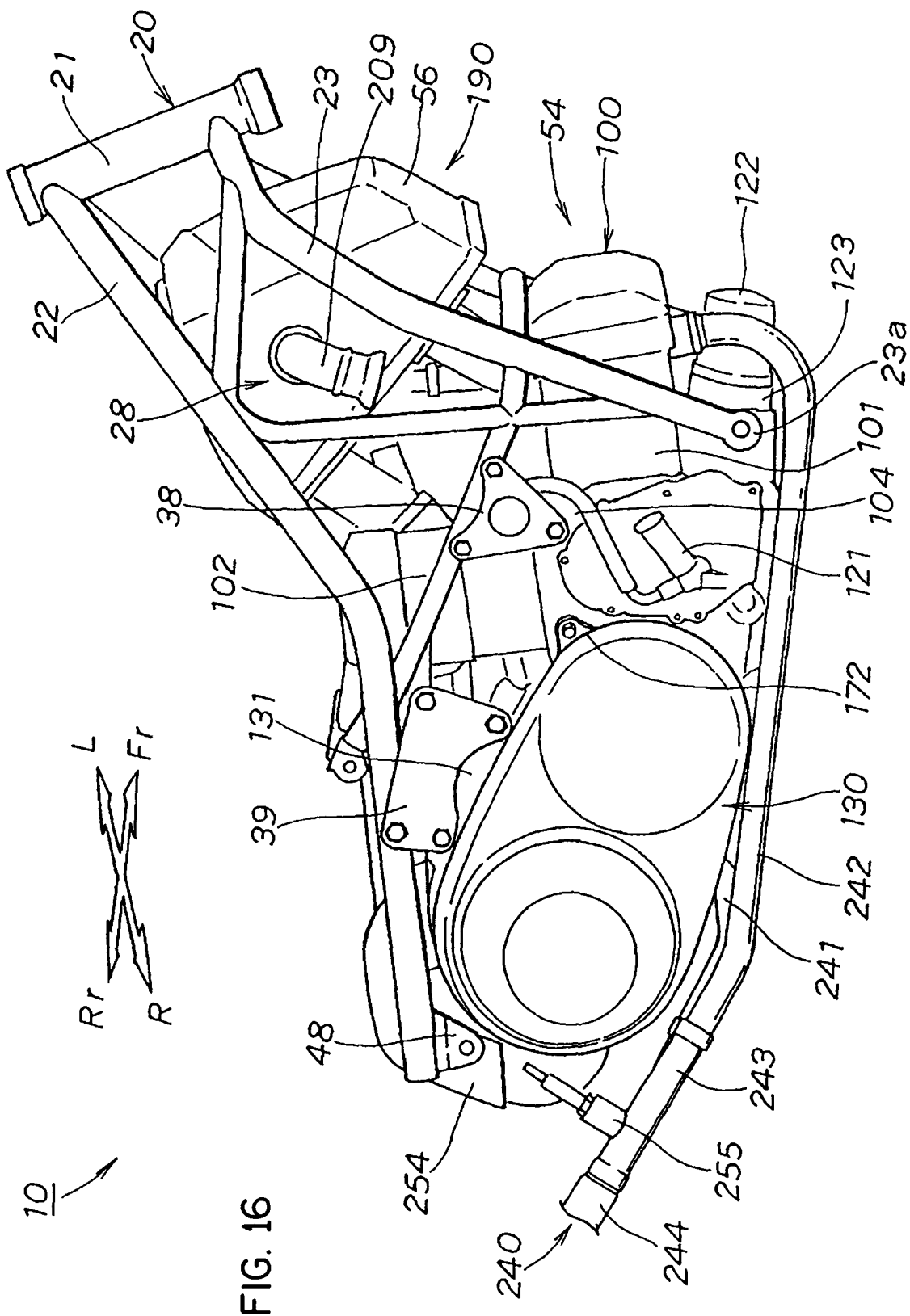
FIG. 16 is a perspective view showing the body frame, the power unit and the circumference of the air cleaner respectively viewed from the right front according to an embodiment of the invention.
Figure 17:
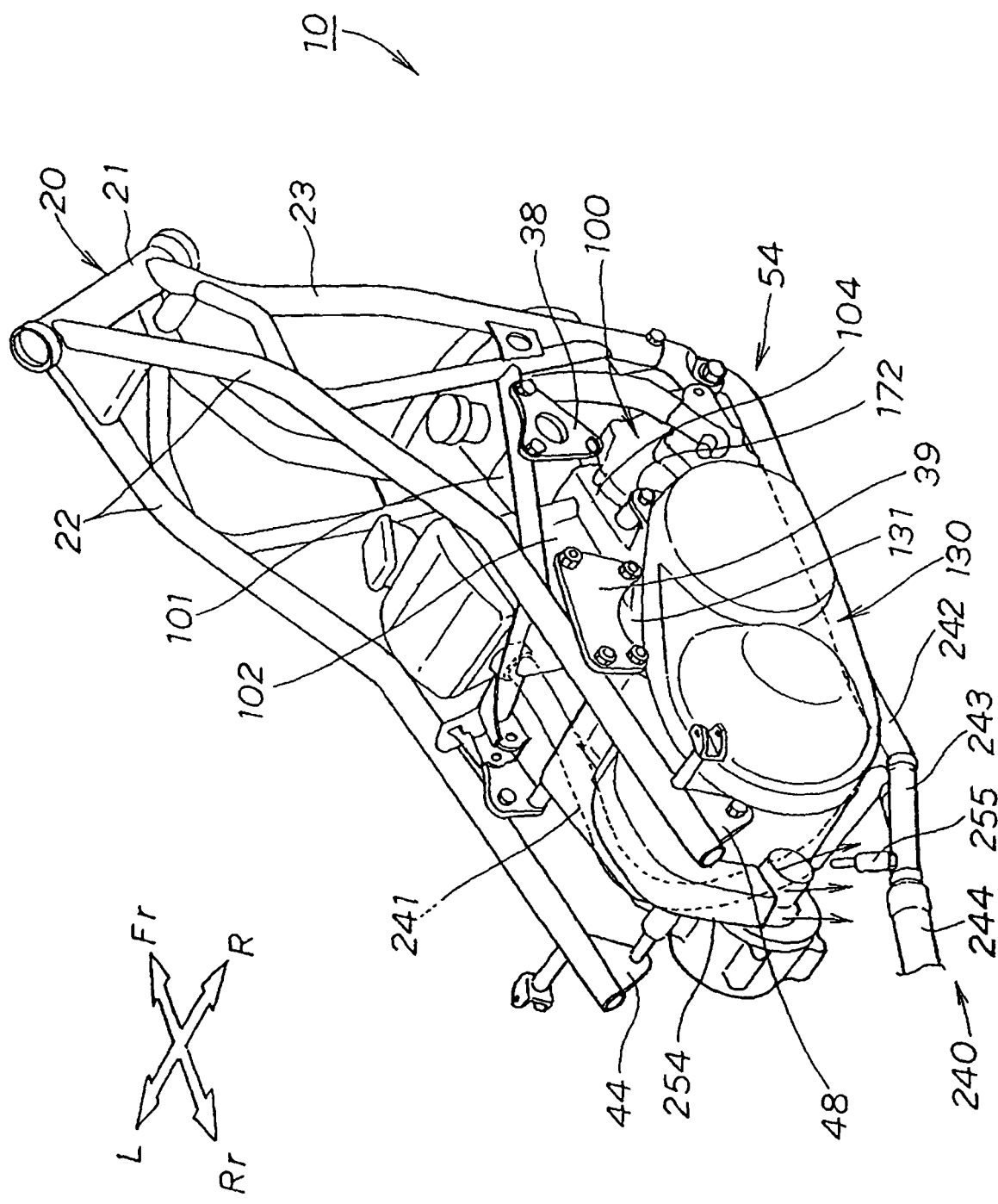
FIG. 17 is a perspective view showing the body frame and the circumference of the power unit respectively viewed from the right rear according to an embodiment of the invention.

Next, the relation between the body frame 20 and the power unit 54 will be described. FIG. 14 is a perspective view showing the body frame and the circumference of the power unit respectively according to an embodiment of the invention and viewed from the left front. FIG. 15 is a perspective view showing the body frame, the power unit and the circumference of the air cleaner respectively according to an embodiment of the invention and viewed from the left rear. FIG. 16 is a perspective view showing the body frame, the power unit and the circumference of the air cleaner respectively according to an embodiment of the invention and viewed from the right front. FIG. 17 is a perspective view showing the body frame and the circumference of the power unit respectively according to an embodiment of the invention and viewed from the right rear.

FIGS. 14 to 17 show that the V-type engine 100 and the transmission unit 130 are suspended from the body frame 20 which is the diamond type frame.

For the V-type engine 100, the left side of the crankcase 104 is attached to the body frame 20 via the left first, second and third hanger plates 35, 36, 37 and the right side of the crankcase 104 is attached to the body frame 20 via the right hanger 23a and the right first hanger plate 38.

In the meantime, for the transmission unit 130, the upside of the left side of the main case 131 is attached to the body frame 20 via the left third and fourth hanger plates 37, 44 and the upside of the right side of the main case 131 is attached to the body frame 20 via the right second and third hanger plates 39, 48.

The cross members 32, 33 also function as a guard member for the engine.

As the body frame 20 is the diamond type frame and the V-type engine 100 is suspended from the diamond type frame, the engine 100 can function as a part of the body frame 20. Therefore, no frame member is required to be arranged below the V-type engine 100. Therefore, the V-type engine 100 can be lowered at a maximum up to (or down to) the height of the ground. As a result, as the crankshaft 103 of the V-type engine 100 is also lowered as shown in FIG. 9, large space can be secured above the low floor 73 (see FIG. 1) by the quantity. Further, the low floor 73 is arranged above the crankcase 104 and the width of a step (the width of the low floor 73) can be narrowed by lowering the V-type engine 100.

Generally, when the crankshaft 103 is lowered, the banking angle θ1 is reduced. In a layout according to the invention, the banking angle θ1 is secured by adopting the V-type engine 100 the width of which is narrow.

Hereby, the degree of freedom in mounting the V-type engine 100 having the banking angle θ1 equal to or exceeding approximately 90° can be more enhanced. In addition, the center of gravity of the low floor type vehicle 10 can be lowered by lowering the V-type engine 100.

To explain referring to FIG. 9, the degree of inclination of the upper frames 22, 22 is reduced after the upper frames are substantially linearly extended, being inclined backward and downward up to the vicinity of the rear cylinder 102 in the bank of the V-type engine 100 and the upper frames are extended up to the vicinity of the pivot (the position of the final output shaft 138) of the swing arm for the rear wheel 62.

Hereby, the upper frames 22, 22 can be substantially linearly extended longitudinally. Therefore, the rigidity of the upper frames 22, 22 can be enhanced and as a result, the rigidity of the body frame 20 can be enhanced.

As described above, the respective fronts of the upper frames 22, 22 contribute to the stability of the intake system 190 and the respective rears of the upper frames 22, 22 can effectively catch a load from the rear wheel 63. Therefore, the rigidity of the body frame 20 can be effectively held by the small-sized and light configuration.

The capacity of the air cleaner 56 can be increased by forming the right and left first reinforcements 24, 24 in the body frame 20 so that they are curved outside as shown in FIG. 15 and even if the air cleaner 56 is arranged in front, the air cleaner can be prevented from interfering with the head pipe 21 and interfering with the maximum angle of traverse of the front fork 51 (see FIG. 2).

A reference number 148 shown in FIG. 15 denotes a servo motor for varying the continuously variable gear ratio and the servo motor controls the continuously variable gear ratio of the belt type continuously variable transmission 141 via the gear for shift 147 shown in FIG. 11. A reference number 121 shown in FIG. 16 denotes a pump for engine cooling water. Further, FIGS. 16 and 17 show that the bracket 172 in a right upper part of the transmission unit 130 is attached to the right side of the crankcase 104 so that the bracket can be detached.

As shown in FIG. 9, the crankcase 104 and the transmission unit 130 are vertically coupled via the left third hanger plate 37 and the coupling member 173, and these left third hanger plate 37 and coupling member 173 are provided on the side of the opening substantially U-shaped when it is viewed from the top of the power unit 54. The left third hanger plate 37 fulfills a role of a coupling member.

The front of the coupling member 173 is attached to a lower part of the left rear of the crankcase 104 via two bolts 174, 174 and the rear of the coupling member 173 is attached to a lower part of the left front of the transmission unit 130 via one bolt 175.

The front of the left third hanger plate 37 (the coupling member 37) is attached to an upper part of the left rear of the crankcase 104 via one bolt 178 and the rear of the left third hanger plate 37 is attached to an upper part of the left front of the transmission unit 130 via one bolt 179.

Hereby, the rigidity of the power unit 54 can be sufficiently secured. Therefore, as the rigidity of the power unit 54 composed of the engine 100 and the transmission unit 130 to be a part of the body frame 20 is enhanced, the rigidity of the body frame 20 can also be enhanced.

Further, as the opening can be reinforced by the upper and lower coupling members 37, 173 by providing the upper and lower coupling members 37, 173 on the side of the opening substantially U-shaped when it is viewed from the top of the power unit 54, desired rigidity can be efficiently achieved, the degree of freedom in securing the rigidity can be enhanced and because the coupling members 37, 173 are not protruded from the body, the appearance of the low floor type vehicle 10 is enhanced.

Further, the coupling member 173 holds a main stand (a stand member) 176 as shown in FIGS. 4 to 6. That is, the main stand 176 is attached so that it can stand and can be housed by coupling a left upper part of the main stand 176 substantially portal-shaped when it is viewed from the front to the lower end of the coupling member 173 and coupling a right upper part of the main stand 176 to a lower part of the transmission unit 130 via a stay 177.

As the coupling member 173 for securing the rigidity of the power unit 54 also fulfills a role of holding the main stand 176, the function of another functional component also be accomplished and the low floor type vehicle 10 can be configured so that the number of parts is small and the configuration is light and small-sized.

Figure 18:
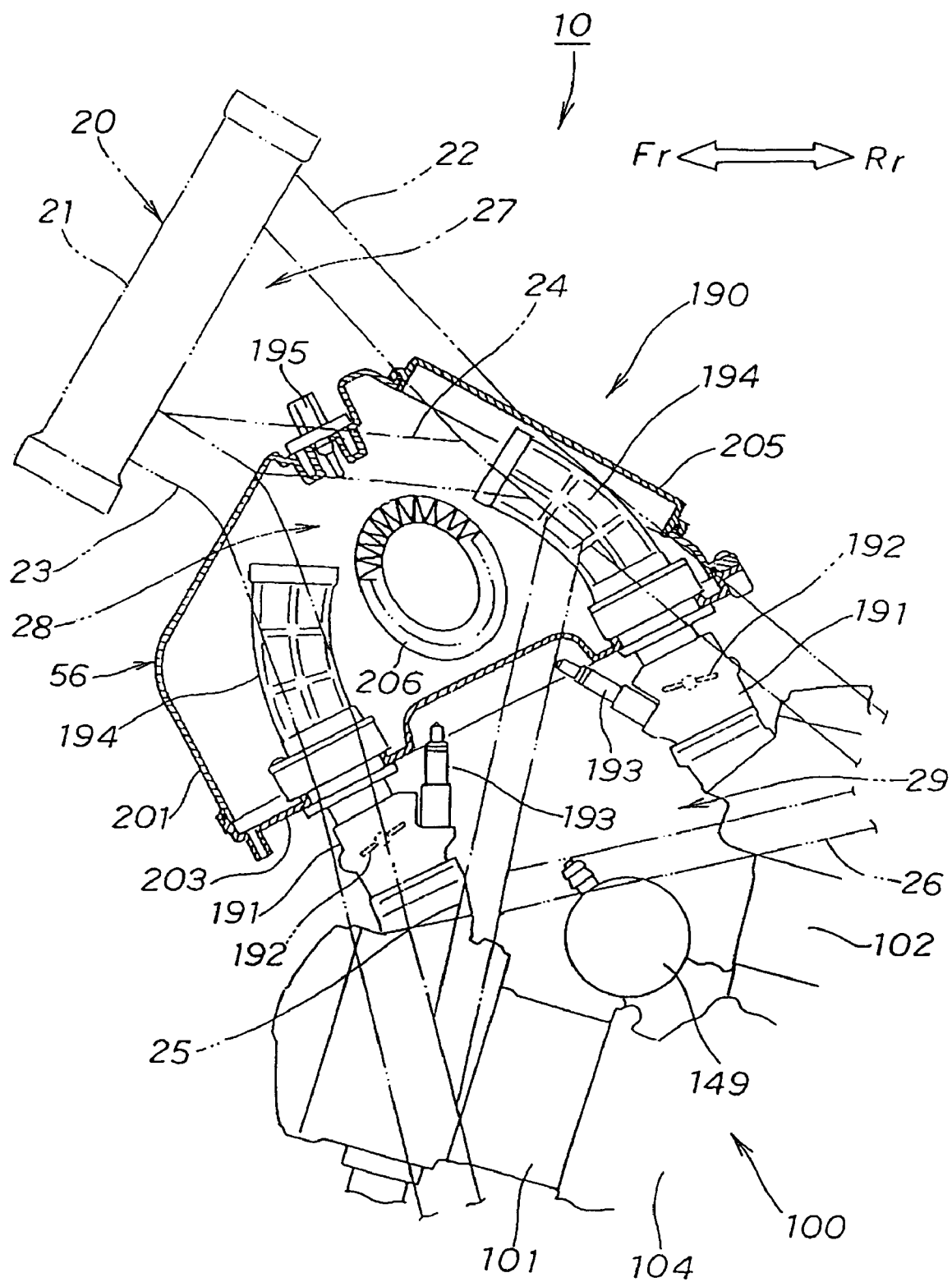
FIG. 18 is a left side view showing the body frame, a V-type engine and the circumference of an intake system respectively according to the invention.
Figure 19:
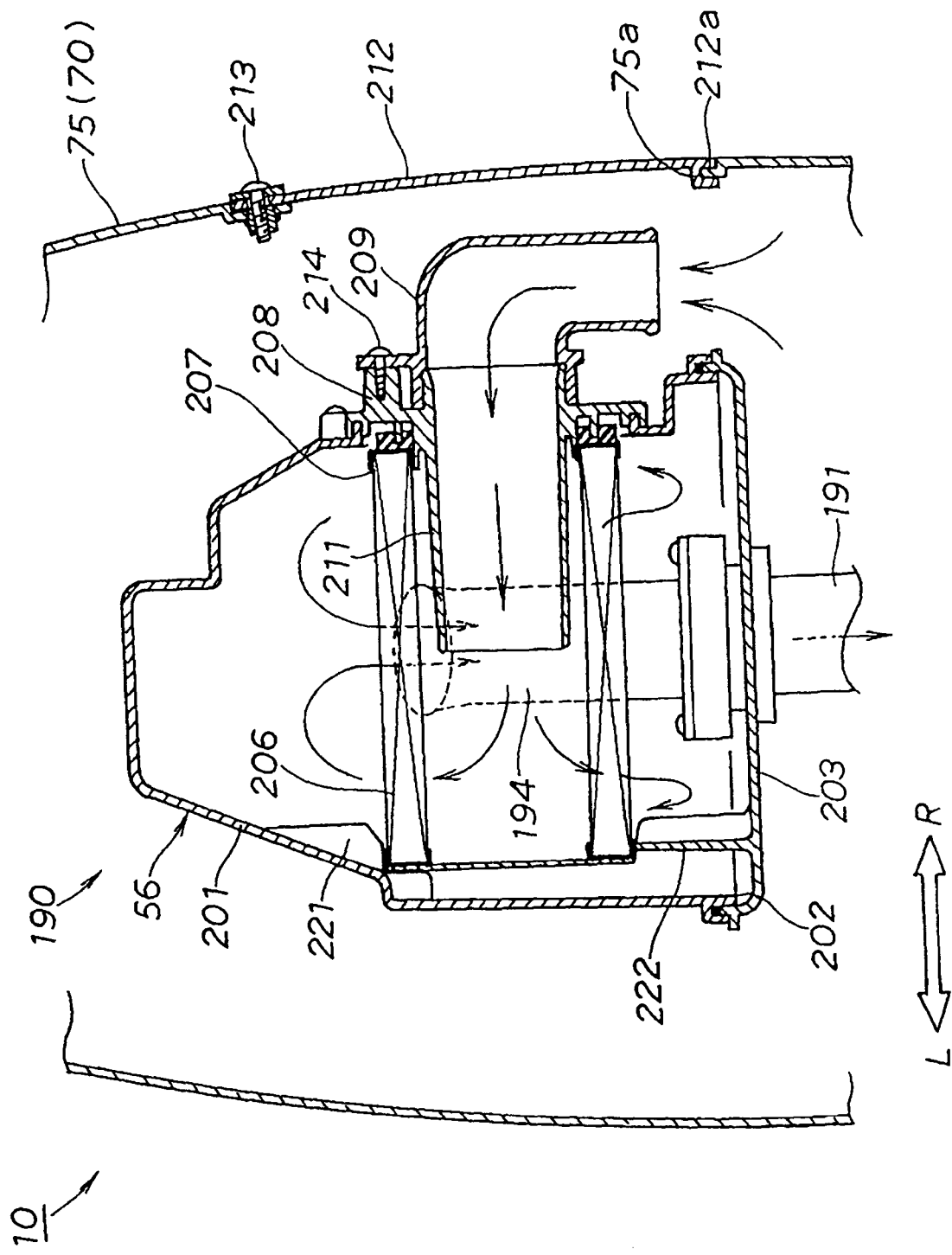
FIG. 19 is a back cross sectional view showing the circumference of the air cleaner and a body cover respectively according to the invention.
Figure 20:
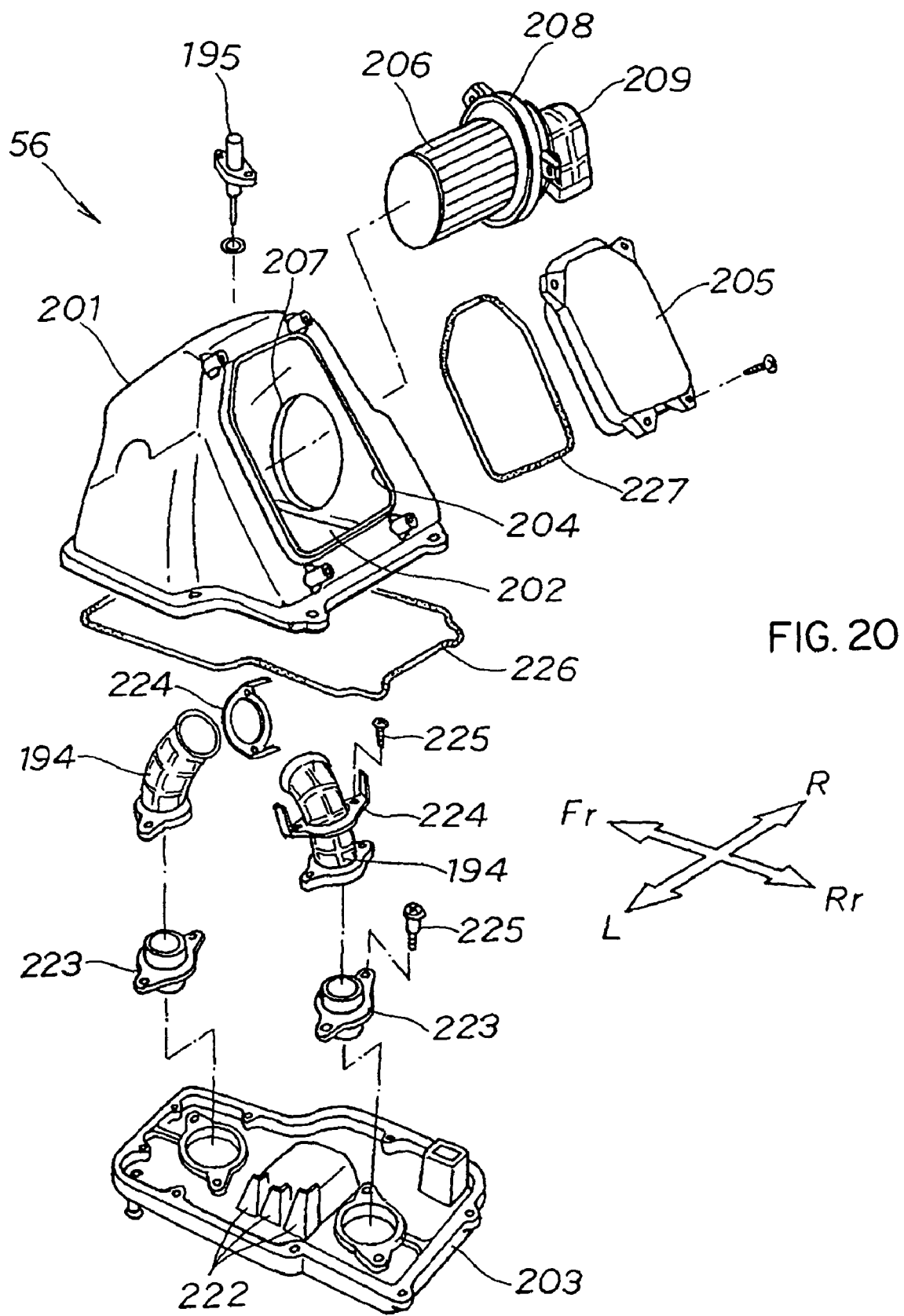
FIG. 20 is an exploded view showing the air cleaner according to the invention.
Figure 21:
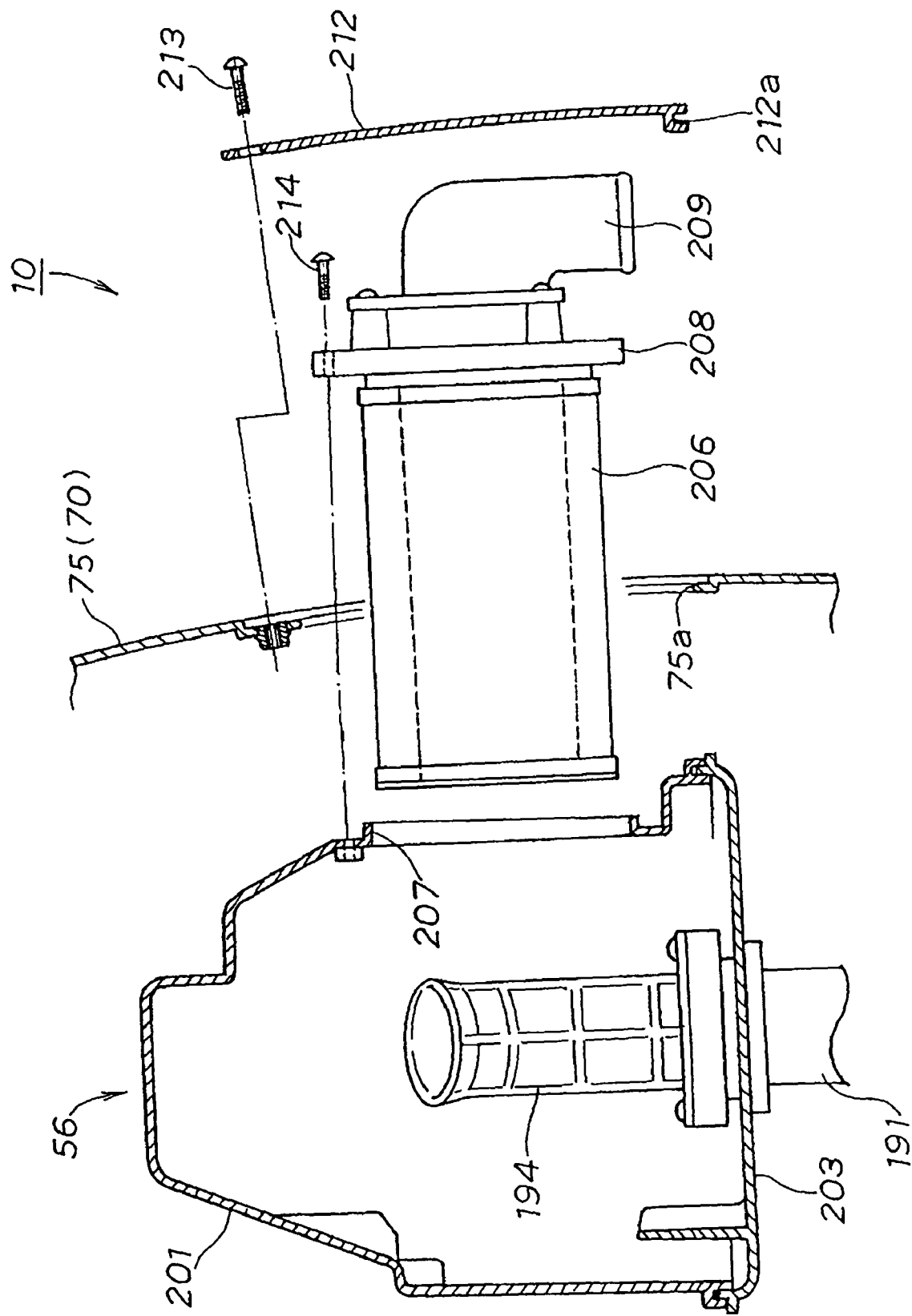
FIG. 21 shows the action of the air cleaner according to the invention.

Next, the intake system 190 will be described. FIG. 18 is a left side view showing the body frame, the V-type engine and the circumference of the intake system respectively according to an embodiment of the invention and shows the cross section of the air cleaner 56. FIG. 19 is a back cross sectional view showing the circumference of the air cleaner and the body cover respectively according to an embodiment of the invention, FIG. 20 is an exploded view showing the air cleaner according to an embodiment of the invention and FIG. 21 shows the action of the air cleaner according to an embodiment of the invention.

To explain referring to FIGS. 9 and 18, the intake system 190 including the intake coupling pipes 191, 191 and the air cleaner 56 is arranged above the V-type engine 100 and the space S2 for arranging the fuel tank 57 as an accessory for a vehicle is provided above the air cleaner 56.

Detailedly, the intake system 190 is arranged between the cylinders 101, 102 in the bank of the V-type engine 100 with the intake system directed toward the head pipe 21 and the fuel tank 57 is arranged above the intake system 190.

The V-type engine 100 is provided with the intake coupling pipes 191, 191 for coupling each cylinder 101, 102 to the air cleaner 56. Each intake coupling pipe 191, 191 is provided with each throttle valve 192, 192 and each fuel injection valve 193, 193 and is provided with each funnel 194, 194 extended in the air cleaner 56. Each funnel 194, 194 is connected to one end of each intake coupling pipe 191, 191 and the funnels are arranged with them curved when they are viewed from the side. A filter element 206 is arranged between these funnels 194, 194.

A reference number 149 in FIG. 18 denotes a cell motor, 195 denotes an intake temperature sensor for detecting intake temperature in the air cleaner 56 and the intake temperature sensor is used for correcting intake temperature when the injection quantity of the fuel injection valves 193, 193 is operated and controlled.

As shown in FIGS. 18 to 20, the air cleaner 56 can be maintained and checked from the side of the low floor type vehicle 10. The air cleaner 56 is concretely composed of a cleaner case 201, a bottom plate 203 that closes an opening 202 at the lower end of the cleaner case 201 and can be detached, the two funnels 194, 194 extended into the case from the bottom plate 203, a lid 205 for checking that closes a checking opening 204 provided to a rear upper part of the cleaner case 201 and can be detached, the cylindrical filter element 206 housed inside the cleaner case 201, a filter checking hole 207 provided to the left side or the right side of the cleaner case 201, a capping member 208 that closes the filter checking hole 207 and can be detached and a substantially L-type intake pipe 209 provided to the capping member 208.

The capping member 208 is provided with a communicating tube 211 to which one end of the intake pipe 209 is attached so that one end can be detached and which communicates with the intake pipe 209 and one end of the filter element 206 communicating with the communicating tube 211 is attached to the capping member 208 so that one end can be detached. Hereby, the air cleaner 56 is provided with the filter element 206 inside and the filter element can be detached together with the capping member 208 on the side of the air cleaner 56.

A center cover 75 (a part of the body cover 70) covering the air cleaner 56 is provided with a hole for checking 75a and is provided with a lid for checking 212 that closes the hole for checking 75a and can be detached. The lid for checking 212 is located in a position opposite to the capping member 208.

Air taken from the intake pipe 209 enters each cylinder 101, 102 of the V-type engine 100 shown in FIG. 8 via the communicating tube 211, the filter element 206, the cleaner case 201, the funnels 194, 194, the intake coupling pipes 191, 191.

To maintain and check the filter element 206, as shown in FIG. 21, first, a screw 213 is detached and a fitting groove 212a at one end of the lid for checking 212 is extracted from the edge of the hole for checking 75a. As a result, the lid for checking 212 is detached from the center cover 75.

Next, a screw 214 is detached and the capping member 208 is detached through the hole for checking 75a. As a result, the intake pipe 209 and the filter element 206 are also detached together with the capping member 208.

To return the filter element 206, a procedure reverse to the procedure for detachment is taken.

As clear from the description, as the air cleaner 56 is configured so that maintenance and a check from the side of the low floor type vehicle 10 are possible, maintenance and a check from the top of the air cleaner 56 are not required. Therefore, available large space can be sufficiently secured over the air cleaner 56.

Further, as the filter element 206 provided inside the air cleaner 56 can be detached together with the capping member 208 on the side of the air cleaner 56 and the lid for checking 212 opposite to the capping member 208 is provided to the body cover 70 covering the air cleaner 56, the filter element 206 can be easily detached from the side of the air cleaner 56 by detaching the capping member 208 after the lid for checking 212 is detached. Therefore, work for the maintenance and the check of the filter element 206 is facilitated and workability is enhanced.

Furthermore, as shown in FIG. 18, as the filter element 206 is arranged between the plural funnels 194, 194 extended in the air cleaner 56, the filter element 206 never interferes with the funnels 194, 194 when the filter element 206 is detached from the side of the air cleaner 56. Therefore, the air cleaner 56 is not required to be large-sized to prevent interference. Therefore, the air cleaner 56 can be miniaturized and as a result, the degree of freedom in design when the air cleaner 56 is mounted in the low floor type vehicle 10 is enhanced.

The space S2 is effectively utilized and the accessory for the vehicle can be easily arranged by providing the space S2 for arranging the accessory for the vehicle such as the fuel tank 57 (see FIG. 9) above the air cleaner and the degree of freedom in designing the distribution of a load can be enhanced. For example, as the center of gravity of the low floor type vehicle 10 can be set in the front by arranging the air cleaner 56 and the fuel tank 57 in the front of the low floor type vehicle 10, a load onto the front wheel 52 and the rear wheel 63 can be more suitably distributed.

As shown in FIG. 18, each intake coupling pipe 191, 191 is characterized in that it is arranged substantially along the upper frame 22 and the down frame 23. That is, the intake coupling pipe 191 connected to the front cylinder 101 in the bank is arranged substantially along the down frame 23 and the intake coupling pipe 191 connected to the rear cylinder 102 in the bank is arranged substantially along the upper frame 22.

Therefore, each intake coupling pipe 191, 191 can be formed substantially linearly. Air can be more smoothly supplied from each intake coupling pipe 191, 191 to each cylinder 101, 102 by adopting each intake coupling pipe 191, 191 substantially linearly. As a result, intake efficiency can be more enhanced and the output performance of the V-type engine 100 can be enhanced.

In addition, as space inside the body frame 20 is effectively used, a compact arrangement is enabled by such configuration, the degree of freedom in design can be increased and the appearance of the low floor type vehicle 10 can also be enhanced. Further, when a rider rides, they can straddle the body frame 20 more easily.

As described above, the upper frame 22 and the down frame 23 respectively opposite to the side of each intake coupling pipe 191, 191 have trussing frame structure. Therefore, the rigidity in a direction in which each intake coupling pipe 191, 191 is extended of the body frame 20 can be enhanced. Therefore, the output performance of the V-type engine 100 suspended by the body frame 20 can be enhanced.

The triangular second space 28 for the trussing frame structure is space for enabling the insertion and the extraction of the filter element 206 of the air cleaner 56. As the second space 28 is provided, the filter element 206 can be easily detached from the side of the air cleaner 56. Therefore, work for the maintenance and the check of the filter element 206 is facilitated and workability is enhanced. In addition, the air cleaner 56 can be miniaturized and lightened.

Reference numbers 221 and 222 in FIG. 19 denote an element presser. Reference numbers 223, 223 in FIG. 20 denote a funnel joint, 224, 224 denote a funnel flange, 225 denotes a screw, and 226 and 227 denote packing.

Figure 22:
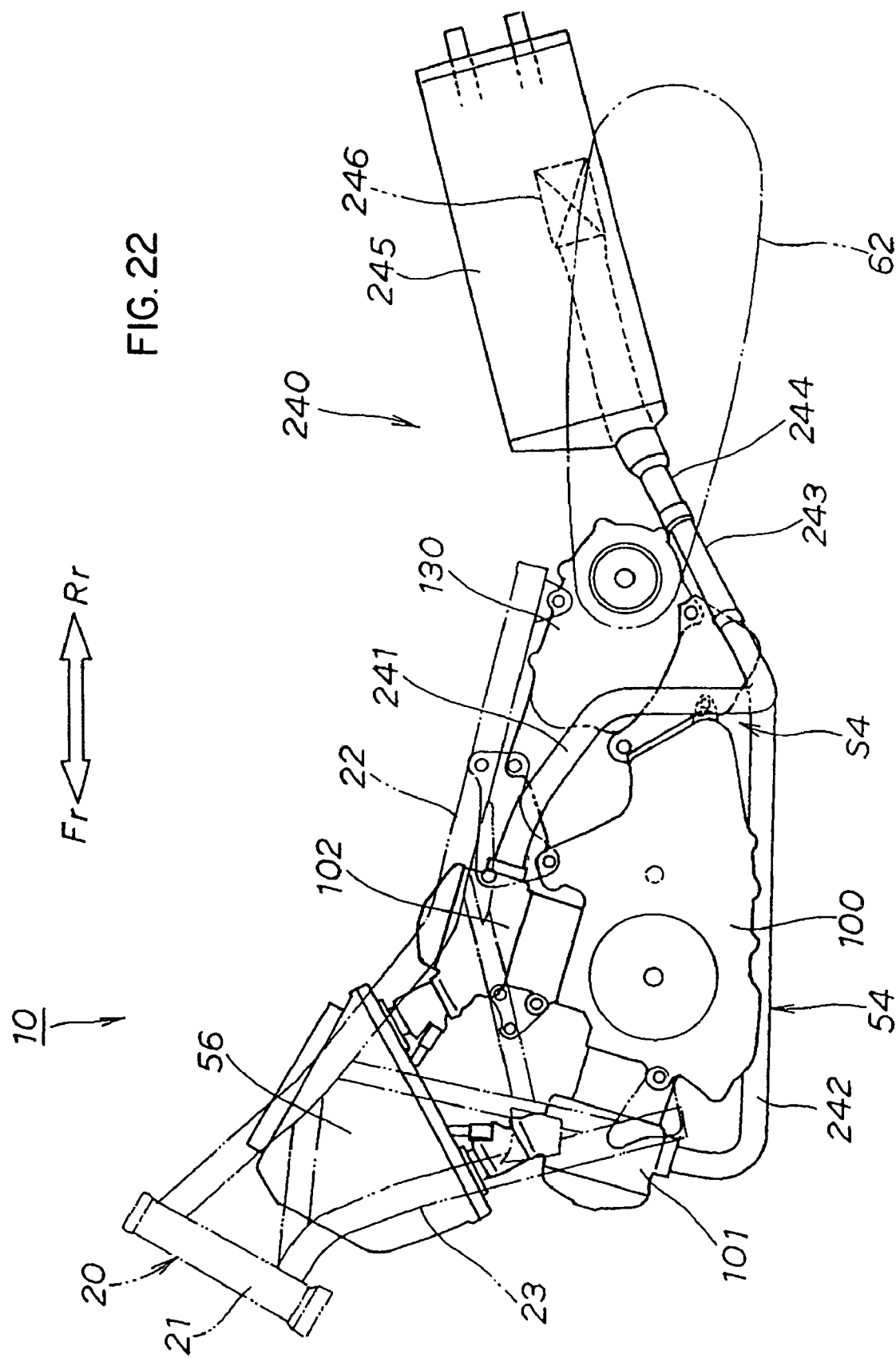
FIG. 22 is a left side view showing the body frame, the power unit and the circumference of an exhaust system respectively according to the invention.
Figure 23:
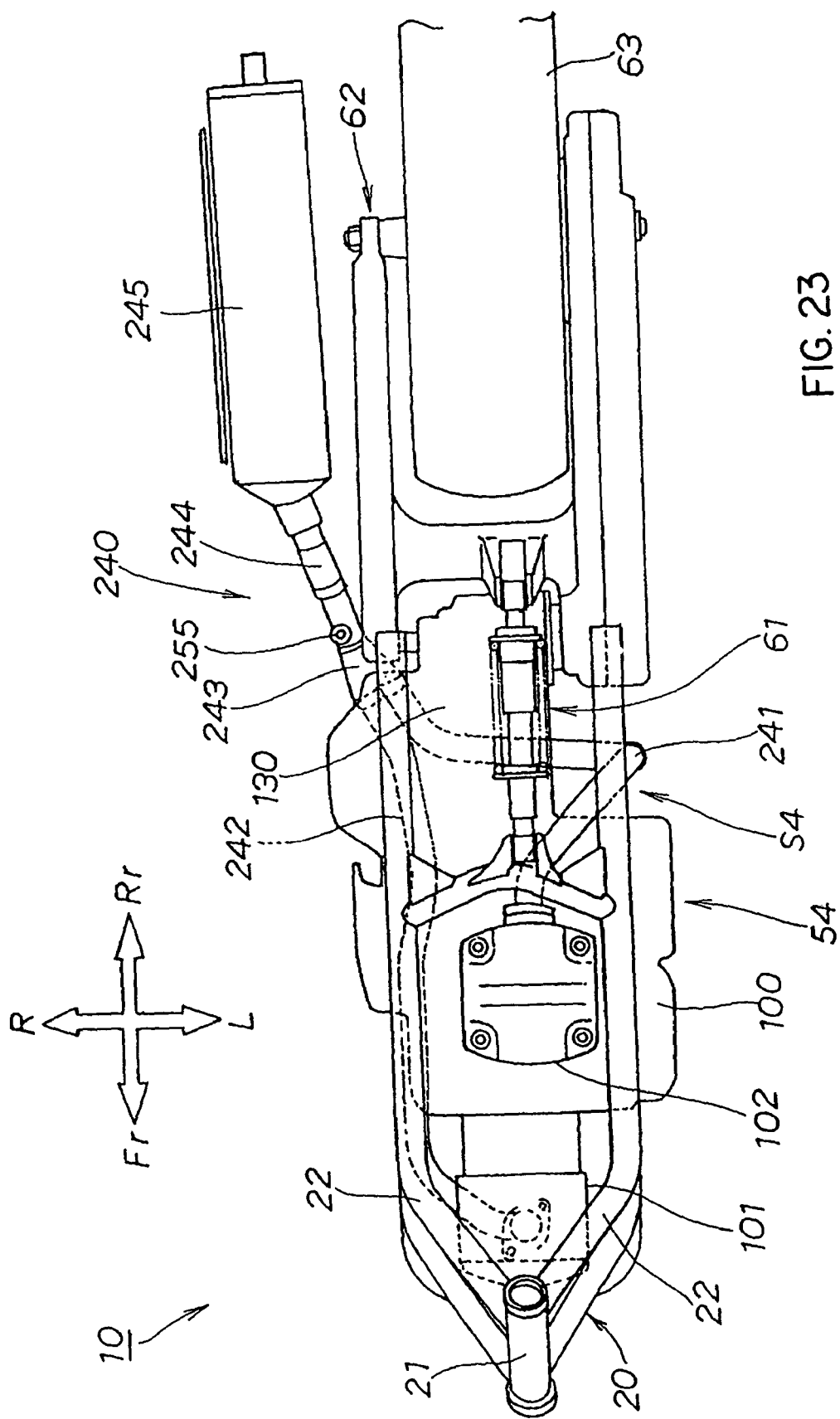
FIG. 23 is a plan showing the body frame, the power unit and the circumference of the exhaust system respectively according to the invention.

Next, an exhaust system 240 of the V-type engine 100 will be described. FIG. 22 is a left side view showing the body frame, the power unit and the circumference of the exhaust system respectively according to the invention and FIG. 23 is a plan showing the body frame, the power unit and the circumference of the exhaust system respectively according to the invention.

To explain also referring to FIGS. 14 to 17, the exhaust system 240 of the V-type engine 100 is composed of a first exhaust pipe 241 connected to the rear cylinder 102 in the bank, a second exhaust pipe 242 connected to the front cylinder 101 in the bank, a collecting pipe 243 in which the rear end of the first exhaust pipe 241 and the rear end of the second exhaust pipe 242 are collected and a muffler 245 connected to the rear end of the collecting pipe 243 via an extending pipe 244. The muffler 245 includes a catalyst 246 (see FIG. 22) and is arranged on the right upside of the rear wheel 63.

The first exhaust pipe 241 connected to the rear cylinder 102 in the bank is extended backward (concretely backward on the left) from the rear cylinder 102 in the bank, the rear end is extended downward, passes space S4 substantially U-shaped when the space is viewed from the top in the power unit 54, the lower end is extended backward (concretely backward on the right) and passes under the power unit 54 and the rear end is connected to the second exhaust pipe 242 via the collecting pipe 243.

As the first exhaust pipe 241 connected to the rear cylinder 102 in the bank of the V-type engine 100 passes the space S4 substantially U-shaped when the space is viewed from the top in the power unit 54, the U-shaped space S4 can be effectively utilized. Therefore, as the first exhaust pipe 241 is not protruded from the body, the appearance of the low floor type vehicle 10 is enhanced.

The second exhaust pipe 242 connected to the front cylinder 101 in the bank is extended downward from the front cylinder 101 in the bank, the lower end is extended rightward, the right end is extended backward along the right downside of the power unit 54 and the rear end is connected to the collecting pipe 243.

As shown in FIG. 14, the second exhaust pipe 242 passes one side (the right side) of the front of the V-type engine 100, and an oil filter 122 and/or an oil cooler 123 are provided to the crankcase 104 in the front on the other side (the left side) of the V-type engine 100. That is, the oil filter 122 and/or the oil cooler 123 are provided in the front of the left half of the crankcase 104.

In the transmission unit 130, an intake port 251 is provided on the right side as shown in FIG. 11 and a fan 253 is provided to a pulley 252 of the belt type continuously variable transmission 141 so that outside air is sucked and cools the transmission unit 130. Exhausted wind after cooling is discharged into the air by an exhausting member 254 provided on the rear upside of the transmission unit 130 as shown in FIGS. 14 to 16.

The exhausting member 254 is a duct vertically reverse U-shaped when it is viewed from the side and is configured so that exhausted wind hits the first and second exhaust pipes 241 and 242. Each part in which exhausted wind hits the first and second exhaust pipes 241, 242 is a part in which the first exhaust pipe 241 and the second exhaust pipe 242 are collected, that is, the collecting pipe 243 or the vicinity. An exhaust sensor 255 is provided to the part in which exhausted wind hits the first and second exhaust pipes 241, 242. That is, the exhaust sensor 255 is provided to the rear of the collecting pipe 243. As the exhaust sensor 255 is cooled by exhausted wind, the structure is advantageous to hold the function and the performance of the exhaust sensor 255.

The exhaust sensor 255 detects the quantity of oxygen in exhaust. Feedback control over the injection quantity of the fuel injection valves 193, 193 (see FIG. 18) based upon detection data is enabled. For example, when the detected quantity of oxygen is large, the quantity of injected fuel through injection valves 193, 193 is increased.

As described above, as the exhaust sensor 255 is provided to the part in which exhausted wind hits the first and second exhaust pipes 241, 242, the exhaust sensor 255 can be cooled by the exhausted wind. As the thermal effect of the exhaust sensor 255 can be reduced by exhaust, the structure is advantageous to hold the function and the performance of the exhaust sensor 255. For example, injection from the fuel injection valves 193, 193 (see FIG. 18) can be always satisfactorily controlled by the exhaust sensor 255.

The exhaust system 240 will be summarized below.

As the power unit 54 is configured in a substantially U shape when it is viewed from the top, the first exhaust pipe 241 connected to the rear cylinder 102 in the bank of the V-type engine 100 is extended backward from the cylinder 102, the rear end is extended downward and passes the space S4 substantially U-shaped when it is viewed from the top, the lower end is extended backward and the rear end can be connected to the second exhaust pipe 242 connected to the front cylinder 101 in the bank of the V-type engine 100.

As described above, the space S4 is effectively utilized and the first exhaust pipe can be connected to the second exhaust pipe 242 connected to the front cylinder 101 in the bank by making the first exhaust pipe 241 connected to the rear cylinder 102 in the bank pass over the power unit 54 and further, extending it downward through the space S4 substantially U-shaped when the space is viewed from the top. Therefore, the plural exhaust pipes for the longitudinal V-type engine can be efficiently arranged.

Further, as exhausted wind in the exhausting member 254 provided to the rear of the transmission unit 130 hits the first and second exhaust pipes 241, 242, the first and second exhaust pipes 241, 242 and exhaust in the pipes can be controlled at desired temperature by the exhausted wind. Particularly, both can be simultaneously cooled by cooling the first and second exhaust pipes 241, 242 and exhaust by exhausted wind after cooling the transmission unit 130, another cooling means is not required to be provided and the low floor type vehicle 10 can be miniaturized.

Furthermore, as exhausted wind from the exhausting member 254 hits the vicinity of the part in which the first exhaust pipe 241 and the second exhaust pipe 242 are collected, exhaust in the first and second exhaust pipes 241, 242 is cooled together, the temperature can be controlled and it is efficient.

As shown in FIG. 14, though the second exhaust pipe 242 is arranged on one side of the front of the V-type engine 100, the first and second exhaust pipes 241, 242 are not arranged in the crankcase 104 on the other side of the front of the V-type engine 100. As the oil filter 122 and/or the oil cooler 123 which are functional components for lubricating and cooling engine oil can be provided to the crankcase 104 on the other side of the front of the V-type engine 100 effectively utilizing space in which the exhaust pipes 241, 242 are not arranged, the low floor type vehicle 10 can be miniaturized.

Next, the arrangement and the configuration of the rear cushion for the rear wheel 63 will be described.

Figure 24:
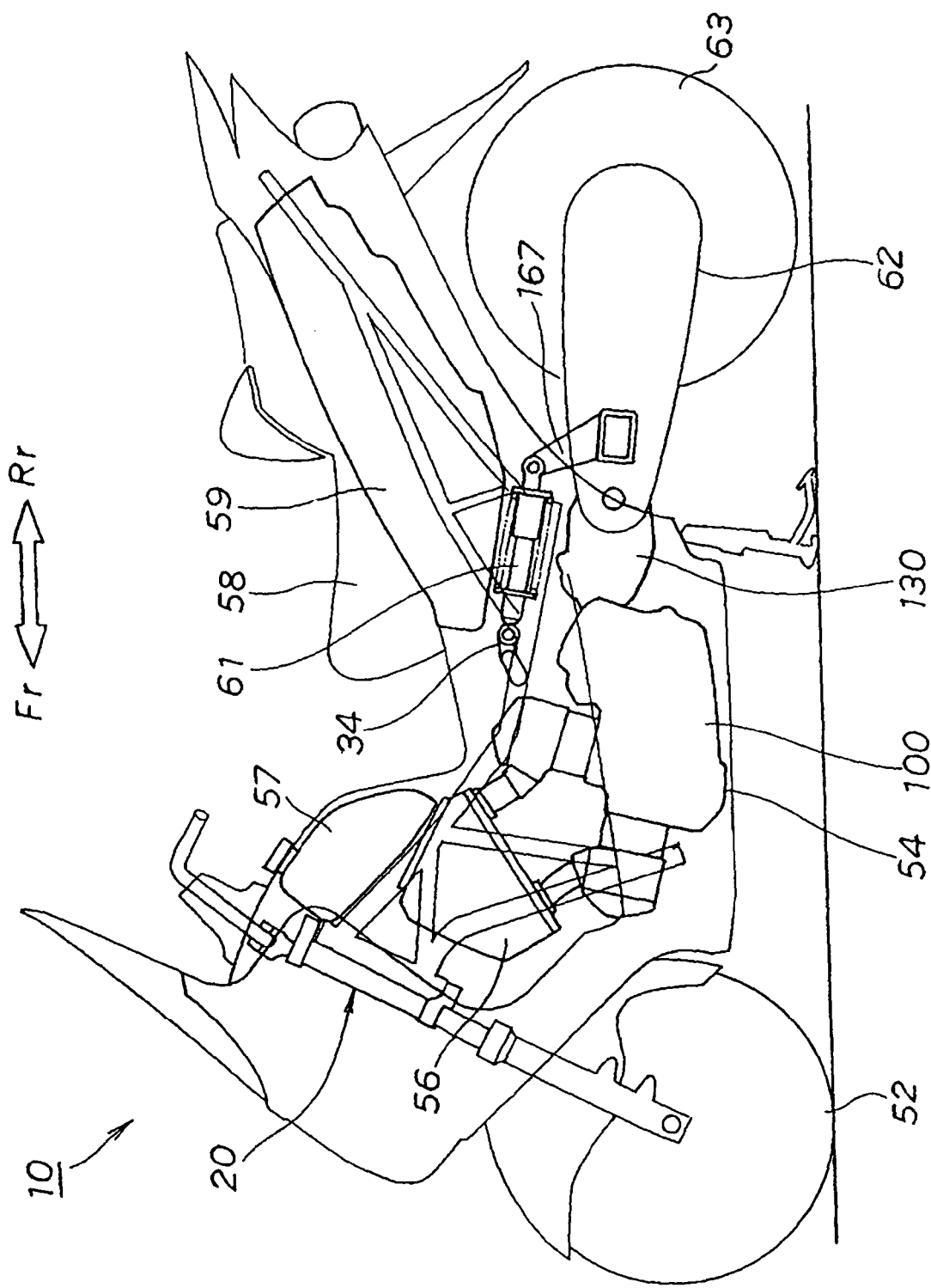
FIG. 24 is a schematic diagram showing the low floor type vehicle according to the invention.

FIG. 24 is a schematic diagram showing the low floor type vehicle according to an embodiment of the invention and shows that the housing box 59 having substantially similar longitudinal length to the longitudinal length of the seat 58 is provided under the seat 58 and the rear cushion 61 for the rear wheel 63 is transversely arranged under the housing box 59. FIG. 13 shows that the rear cushion 61 is arranged substantially in the center of the body (in the center in the width of the body).

Figure 25:
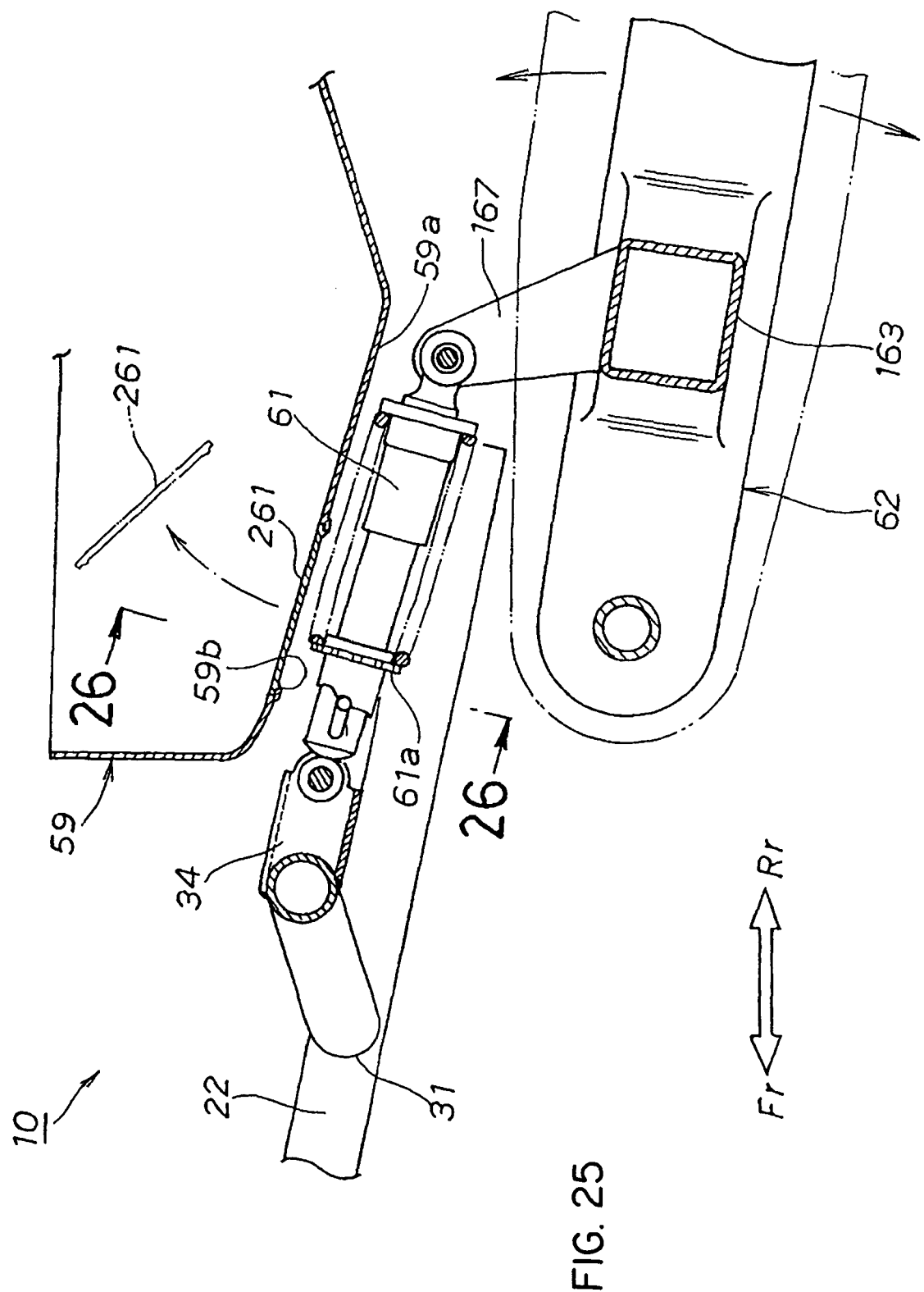
FIG. 25 is a left side view showing the circumference of a housing box and a rear cushion for a rear wheel respectively according to the invention.
Figure 26:
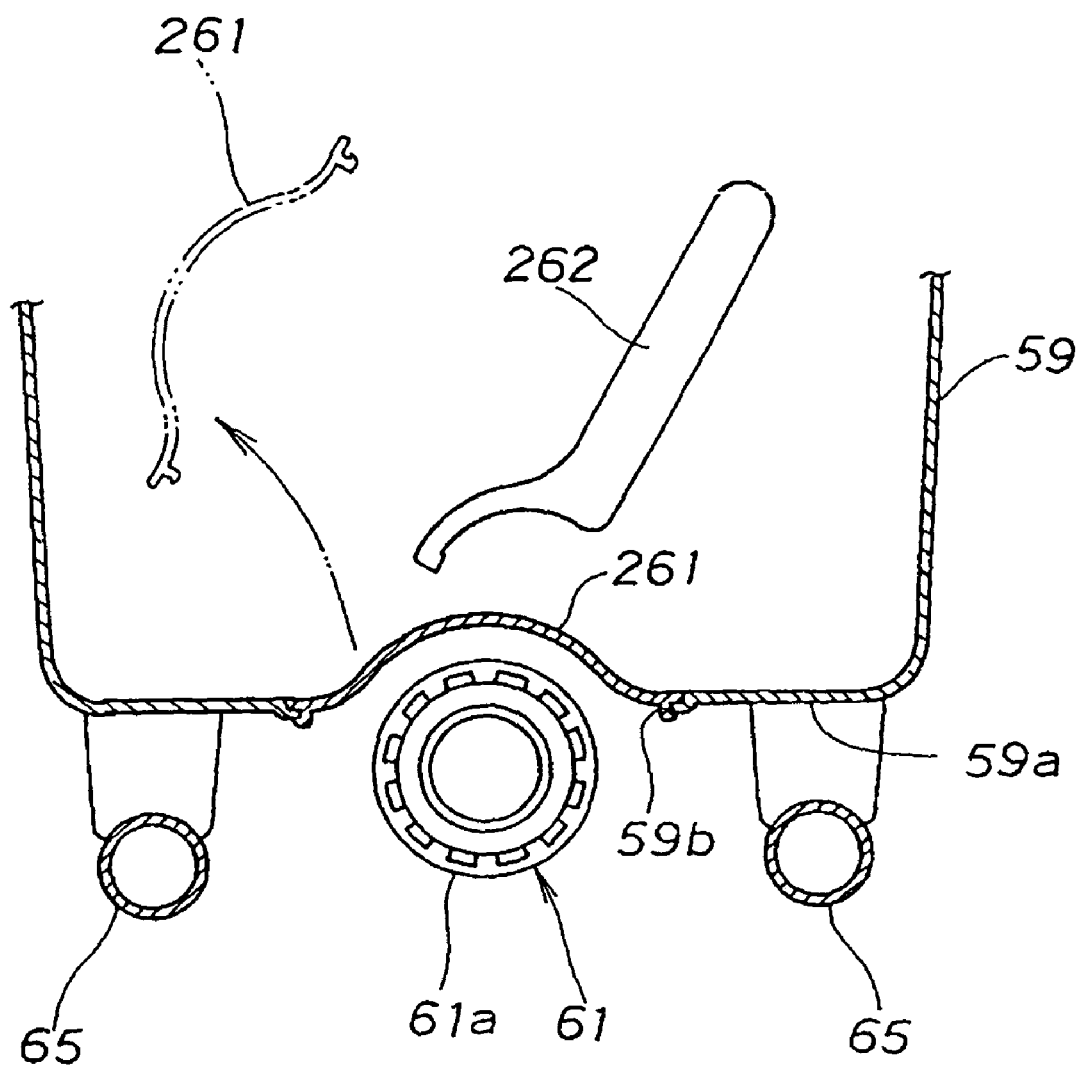
FIG. 26 is a cross sectional view viewed along a line 26-26 in FIG. 25.

FIG. 25 is a left side view showing the circumference of the housing box and the rear cushion for the rear wheel respectively according to the invention and FIG. 26 is a cross sectional view viewed along a line 26—26 in FIG. 25.

The rear cushion for the rear wheel 63 is arranged along the rear of the upper frame 22. Detailedly, the rear cushion 61 is arranged over the upper frame 22 and substantially in parallel with the upper frame 22 by coupling one end of the rear cushion 61 to the bracket for the cushion 34 of the upper frame 22 and coupling the other end of the rear cushion 61 to a bracket for a cushion 167 of the swing arm 62.

The housing box 59 is provided with a lid for checking 261 for the rear cushion 61 at the bottom 59a. The rear cushion 61 is provided with an adjusting member 61a for adjusting cushion characteristics. The bottom 59a of the housing box 59 is located over the adjusting member 61a.

When the rear cushion 61 is adjusted, the lid for checking 261 attached to the bottom 59a by elastic fitting so that the lid can be detached is detached, a tool 262 is inserted from a hole for checking 59b of the bottom 59a and the adjusting member 61a has only to be adjusted, providing easy adjustment.

Structure for attaching the rear cushion 61 will be summarized below.

As the rear cushion for the rear wheel 63 is transversely (horizontally) arranged under the housing box 59, the housing box does not interfere with the rear cushion for the rear wheel 63 located substantially in the center of the body even if the housing box 59 is longitudinally extended. Therefore, the housing box 59 having the substantially similar longitudinal length to the longitudinal length of the seat 58 can be arranged under the seat 58. Therefore, housing space for housing a long thing having a large diameter can be easily secured by extending the housing box 59 longitudinally and expanding the housing space.

Further, as the lid for checking 261 of the rear cushion for the rear wheel 63 is provided to the bottom of the housing box 59, the lid for checking 261 is detached and the rear cushion 61 can be maintained and checked. As the rear cushion can be easily maintained and checked without detaching the housing box 59 and the body cover 70 (see FIG. 1), the workability is enhanced.

Furthermore, as the rear cushion for the rear wheel 63 is arranged along the rear of the upper frame 22 of the diamond type frame 20, the rigidity of the rear cushion for rear wheel 63 can be sufficiently secured by the upper frame 22 having large rigidity and the structure of suspension can be miniaturized.

Figure 27:
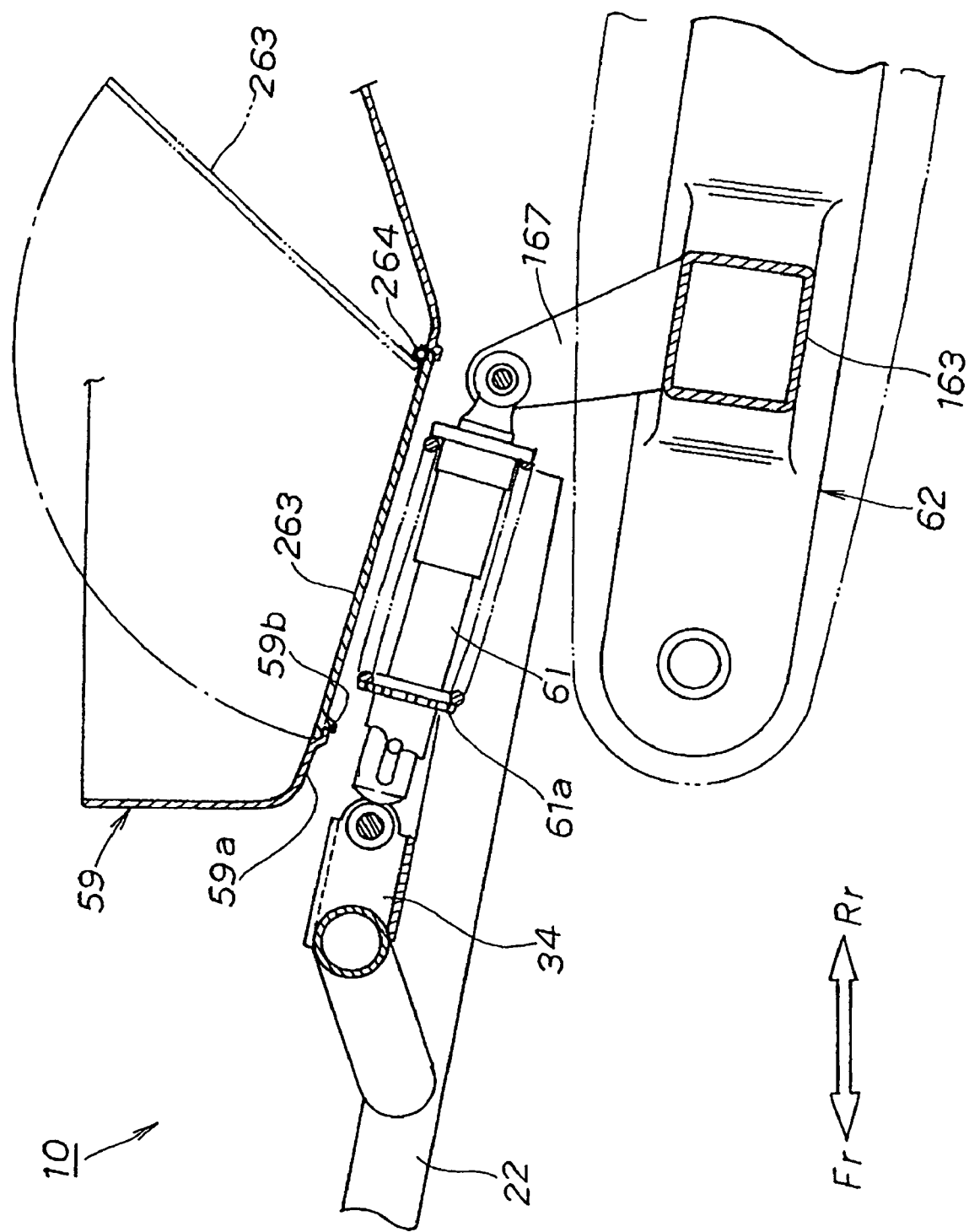
FIG. 27 shows a transformed example of the housing box according to the invention.
Figure 28:
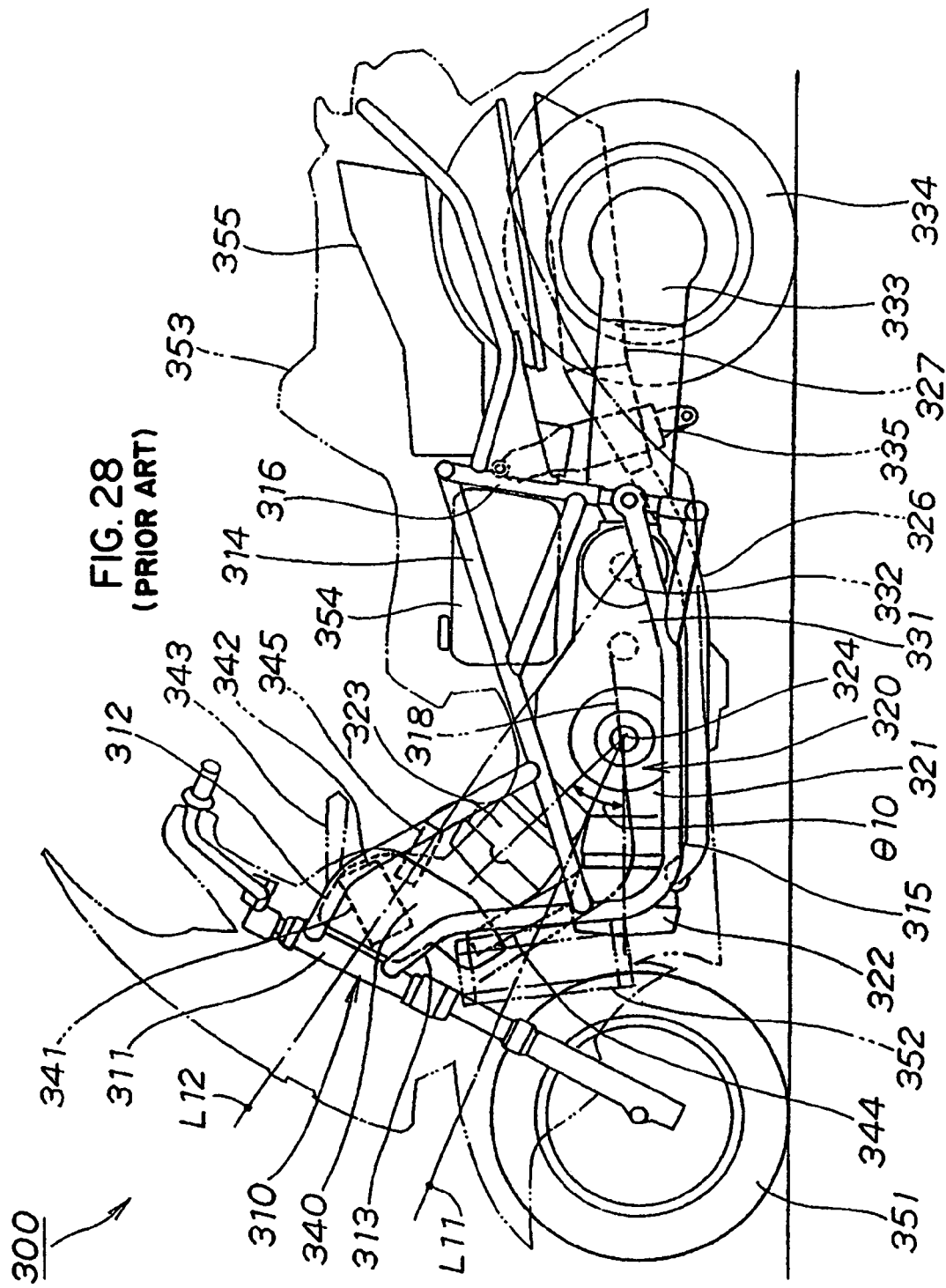
FIG. 28 is a schematic diagram showing a conventional type low floor type vehicle.

FIG. 27 shows a transformed example of the housing box according to an embodiment of the invention and corresponds to an embodiment shown in FIG. 25. A housing box 59 in the transformed example is characterized in that a lid for checking 263 provided to the bottom 59a has hinge structure that the lid is opened or closed by a hinge 264. The other configuration is similar to that shown in FIGS. 24 to 26.

We claim:

1. A rear cushion installation structure of a low floor vehicle comprising:
   a body cover for covering a vehicle body that comprises a low floor which has a step floor for putting feet of a rider thereon, and an engine mounted below the low floor, the engine being connected to an intake system,
   a body frame comprising a head pipe, a front upper part, a rear upper part, and a swing arm pivot, wherein the front upper part and rear upper part extends from the head pipe substantially along a straight line passing through the a central point of the head pipe and the swing arm pivot point and wherein the rear upper part of the body frame has a reduced degree of downward inclination relative to the front upper part of the body frame,
   a rear cushion for a rear wheel arranged in a center of the vehicle body horizontally on the rear upper part of the body frame,
   a seat mounted on the rear upper part of the body frame,
   a housing box having a bottom surface and defining a housing space above the bottom surface, the housing box arranged under the seat with a longitudinal length substantially equal to a longitudinal length of an underside of the seat, the bottom surface of the housing box positioned adjacent to the rear cushion, a lid provided at the bottom of the housing box for checking the rear cushion, and wherein the rear cushion for the rear wheel is transversely arranged under the housing box and wherein the engine and intake system are arranged in a space below the straight line passing through the a central point of the head pipe and the swing arm pivot point.

2. The rear cushion installation structure of claim 1, wherein the body frame comprises a diamond frame composed of an upper frame extended backward and downward from the head pipe and a down frame extended downward from the head pipe;

the engine is suspended by the diamond frame; and the rear cushion is arranged along a rear of the upper frame.

3. The rear cushion installation structure of claim 2, wherein the engine is connected to the diamond frame, and the rear cushion is attached to the rear of the upper frame.

4. A rear cushion and seat structure of a low floor vehicle comprising:

a body cover for covering a vehicle body that comprises a low floor which has a step floor for putting the feet of a rider thereon, and an engine mounted below the low floor, the engine being connected to an intake system, a body frame comprising right and left upper frames extending backward and downward from an upper side of a head pipe substantially along a straight line passing through the a central point of the head pipe and the swing arm pivot point, the upper frames including front parts and rear parts, wherein the rear parts include a reduced degree of downward inclination relative to the front parts, and right and left lower frames extending downward from a lower side of a head pipe, the upper and lower frames being coupled to the engine, a cylinder portion of the engine being positioned between the upper frames, a rear cushion for a rear wheel attached horizontally to the upper frames so as to extend along the rear parts of the upper frames, a seat mounted on the rear parts of the upper frames, and a housing box having a bottom and arranged under the seat with a longitudinal length substantially equal to a longitudinal length of an underside of the seat, the bottom of the housing box positioned adjacent to the rear cushion and including a lid for checking the rear cushion, wherein the rear cushion is horizontally arranged under the housing box and wherein the engine and the intake system is arranged below the straight line passing through a central point of the head pipe and the swing arm pivot point.

5. The rear cushion and seat structure of claim 4, wherein the rear cushion is in the center of the vehicle body of the low floor vehicle.

6. A low floor vehicle comprising:

a body cover for covering a vehicle body, the body cover including a low floor for supporting feet of a rider thereon, and an engine mounted at least partially below the low floor, the engine being connected to an intake system;

a body frame comprising a head pipe, an upper frame and a swing arm pivot, the upper frame including a front part and a rear part, the upper frame extending generally along a downwardly angled reference line that extends from a central region of the head pipe to the swing arm pivot, the front part of the upper frame being oriented at a steeper downward angle than rear part of the upper frame, a swing arm connected to the body frame at the swing arm pivot;

a rear shock absorber for a rear wheel of the vehicle, the rear shock absorber being mounted between the rear part of the upper frame and the swing arm, and the rear shock absorber extending generally in a front to rear direction;

a seat mounted on the rear part of the upper frame;

a storage compartment mounted beneath the seat, the storage compartment having a bottom surface, the storage compartment defining a storage volume above the bottom surface and beneath the seat, and the rear shock absorber extending generally along an underside of the bottom surface of the storage compartment;

an access panel defining at least a portion of the bottom surface of the storage compartment, the access panel being removable to provide access to the rear shock absorber; and wherein the engine and intake system are arranged in a space below the upper frame.

* * * * *